US012620723B2

(12) United States Patent
Zhang et al.

(10) Patent No.: US 12,620,723 B2

(45) Date of Patent: May 5, 2026

(54) DUAL-POLARIZED MAGNETOELECTRIC DIPOLE ANTENNA AND ELECTRONIC DEVICE

(71) Applicants: Beijing BOE Technology Development Co., Ltd., Beijing (CN); BOE Technology Group Co., Ltd., Beijing (CN)

(72) Inventors: Dongdong Zhang, Beijing (CN); Shihua Wang, Beijing (CN); Youjian Hu, Beijing (CN); Yali Wang, Beijing (CN); Feng Qu, Beijing (CN); Biqi Li, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 202 days.

(21) Appl. No.: 18/579,334

(22) PCT Filed: Dec. 26, 2022

(86) PCT No.: PCT/CN2022/141915

§ 371 (c)(1),
(2) Date: Jan. 13, 2024

(87) PCT Pub. No.: WO2024/138312

PCT Pub. Date: Jul. 4, 2024

(65) Prior Publication Data

US 2025/0087896 A1 Mar. 13, 2025

(51) Int. Cl.

*H01Q 19/10* (2006.01)
*H01Q 21/24* (2006.01)

(52) U.S. Cl.

CPC .......... *H01Q 19/108* (2013.01); *H01Q 21/24* (2013.01)

(58) Field of Classification Search

CPC ......... H01Q 1/38; H01Q 19/108; H01Q 21/24
See application file for complete search history.

(56) References Cited

U.S. PATENT DOCUMENTS

2005/0134517 A1* 6/2005 Gottl .................... H01Q 19/108 343/797

FOREIGN PATENT DOCUMENTS

CN 105449348 A 3/2016
CN 107104272 A 8/2017

(Continued)

*Primary Examiner* — David E Lotter

(74) *Attorney, Agent, or Firm* — HOUTTEMAN LAW LLC

(57) ABSTRACT

A dual-polarized magnetoelectric dipole antenna, including a reflection plate, electric and magnetic dipoles, where the electric dipole includes four first electrodes; the magnetic dipole includes four second electrodes; the second electrodes are in one-to-one correspondence with the first electrodes, and each second electrode is connected between a corresponding first electrode and the reflection plate; each first electrode includes first and second sides connected to each other; the first side of the first electrode is adjacent to the first side of one adjacent first electrode, and the second side of the first electrode is adjacent to the second side of other one adjacent first electrode; each second electrode includes two sub-electrodes connected to the first and second sides of a corresponding first electrode, respectively; the sub-electrode has a slit opening therein, and an extending direction of the slit opening is parallel to a plane where the reflection plate is located.

19 Claims, 24 Drawing Sheets

(56) References Cited

FOREIGN PATENT DOCUMENTS

| | | | |
|---|---|---|---|
| CN | 109309282 | A | 2/2019 |
| CN | 109888478 | A | 6/2019 |
| CN | 110518348 | A | 11/2019 |
| CN | 111262005 | A | 6/2020 |
| CN | 111710982 | A | 9/2020 |
| CN | 111883915 | A | 11/2020 |
| CN | 212434829 | U | 1/2021 |
| CN | 113078459 | A | 7/2021 |
| CN | 113078459 | B | 3/2022 |
| CN | 114498003 | A | 5/2022 |
| CN | 114744401 | A | 7/2022 |
| KR | 102335213 | B1 | 12/2021 |
| WO | WO 2021021017 | A1 | 2/2021 |

* cited by examiner

DUAL-POLARIZED MAGNETOELECTRIC DIPOLE ANTENNA AND ELECTRONIC DEVICE

TECHNICAL FIELD

The present disclosure relates to the field of communication technology, and particularly to a dual-polarized magnetoelectric dipole antenna and an electronic device.

BACKGROUND

A magnetoelectric dipole antenna designed based on the complementary principle has advantages of wide frequency band, stable in-band gain, low back radiation, low cross polarization, almost same patterns in an E plane and an H plane, and the like, so that the magnetoelectric dipole antenna has wide application prospect in a wireless communication system, but the application range thereof is limited by disadvantages of higher profile, larger volume, three-dimensional feed structure, and the like. Therefore, a miniaturized design of the magnetoelectric dipole antenna is required. The miniaturized design of the antenna includes miniaturization of the lateral and longitudinal dimensions. The miniaturization of the lateral dimensions mainly refers to miniaturization of a radiating element, while the miniaturization of the longitudinal dimensions corresponds to reduction of a profile of the antenna. For a magnetoelectric dipole antenna, the miniaturization of the lateral dimension mainly refers to miniaturization of a half-wavelength electric dipole in the horizontal direction, and the miniaturization of the longitudinal dimension refers to miniaturization of a quarter-wavelength magnetic dipole in a vertical direction. At present, researches on the miniaturization of the electric dipole are relatively few, mainly including changing a shape of the electric dipole, bending the shape of the electric dipole, and the like; while researches on the miniaturization of the magnetic dipole are relatively more, and the methods for reducing the profile of the magnetic dipole mainly include folding, inclining or bending a vertical metal wall, forming a slot in a middle floor of the vertical wall, loading a dielectric, and the like. These methods cause that the complexity of the three-dimensional structure of the antenna is increased to different degrees, which is not beneficial to the large-scale production of the antenna. Therefore, a miniaturized high-gain dual-polarized magnetoelectric dipole antenna, which is simple in structure and easy to process, is required to be designed, to better meet the requirements of application of a modern wireless communication system.

SUMMARY

The present disclosure is directed to at least one of the problems in the related art, and provides a dual-polarized magnetoelectric dipole antenna and an electronic device.

In a first aspect, an embodiment of the present disclosure provides a dual-polarized magnetoelectric dipole antenna, including a reflection plate, an electric dipole parallel to the reflection plate, and a magnetic dipole perpendicular to and electrically connected to the reflection plate, where the electric dipole includes four first electrodes; the magnetic dipole includes four second electrodes; the four second electrodes and the four first electrodes are in one-to-one correspondence, and each of the four second electrodes is connected between the first electrode corresponding to the second electrode and the reflection plate;

each of the four first electrodes includes a first side and a second side connected to each other; for any one of the four first electrodes, the first side of the first electrode is adjacent to the first side of one of the other three first electrodes adjacent to the first electrode, and the second side of the first electrode is adjacent to the second side of other one of the other three first electrodes adjacent to the first electrode; and each of the four second electrodes includes two sub-electrodes, and the two sub-electrodes are connected to the first side and the second side of the first electrode corresponding to the second electrode, respectively; for any one of the two sub-electrodes, a slit opening is in the sub-electrode, and an extending direction of the slit opening is parallel to a plane where the reflection plate is located.

Each of the two sub-electrodes includes a first region and a second region arranged side by side along the extending direction of the slit opening in the sub-electrode; the slit opening includes a first slit opening and a second slit opening; the first slit opening is in the first region, the second slit opening is in the second region, and the first slit opening and the second slit opening are alternately arranged.

Third sides of the two sub-electrodes of each of the four second electrodes are connected to each other, and each of the two sub-electrodes further includes a fourth side opposite to the third side; and the first slit opening in the sub-electrode penetrates through the fourth side.

In each of the two sub-electrodes, numbers of the first slit opening and the second slit opening are equal to each other.

In each of the two sub-electrodes, a number of the first slit opening is different by one from a number of second slit opening.

In each of the two sub-electrodes, spacings between any two adjacent ones of a plurality of first slit openings are equal to each other, and spacings between any two adjacent ones of a plurality of second slit openings are equal to each other.

In each of the two sub-electrodes, widths and/or lengths of respective first slit openings are equal to each other, and widths and/or lengths of respective second slit openings are equal to each other.

Each of the two sub-electrodes includes two slit openings, and orthographic projections of the two slit openings on the reflection plate partially overlap each other.

Each of the two sub-electrodes includes a first region and a second region arranged side by side along the extending direction of the slit opening in the sub-electrode; the slit openings include a first slit opening, a second slit opening, and a third slit opening; the first slit opening is in the first region, the second slit opening is in the second region, and the first slit opening and the second slit opening are arranged in one-to-one correspondence; one end of the third slit opening is in the first region and is arranged alternately with the first slit opening, and the other end of the third slit opening is in the second region and is arranged alternately with the second slit opening.

Orthographic projections of both ends of the third slit opening on the reflection plate overlap orthographic projections of the first slit opening and the second slit opening on the reflection plate, respectively.

In each of the two sub-electrodes, spacings between any two adjacent ones of a plurality of first slit openings are equal to each other, spacings between any two adjacent ones of a plurality of second slit openings are equal to each other, and spacings between any two adjacent ones of a plurality of third slit openings are equal to each other.

In each of the two sub-electrodes, widths and/or lengths of respective first slit openings are equal to each other, widths and/or lengths of respective second slit openings are equal to each other, and widths and/or lengths of respective third slit openings are equal to each other.

Each of the four first electrodes has a hollowed-out pattern therein.

A center of the hollowed-out pattern in each of the four first electrodes coincides with a center of an outline of the first electrode.

The dual-polarized magnetoelectric dipole antenna further includes a first feed line and a second feed line; the four second electrodes of the magnetic dipole define a cross-shaped accommodation region, and the first feed line and the second feed line cross each other in the cross-shaped accommodation region.

A spacing between the first feed line and the second feed line is in a range of 0.8 mm to 1.2 mm.

The first feed line and the second feed line are both Γ-shaped feed lines.

The dual-polarized magnetoelectric dipole antenna further includes a first radio frequency connector connected to the first feed line, and a second radio frequency connector connected to the second feed line.

The reflection plate is made of metal.

In a second aspect, an embodiment of the present disclosure provides an electronic device, which includes any one of the dual-polarized magnetoelectric dipole antennas described above.

DETAIL DESCRIPTION OF EMBODIMENTS

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

Figure 1:
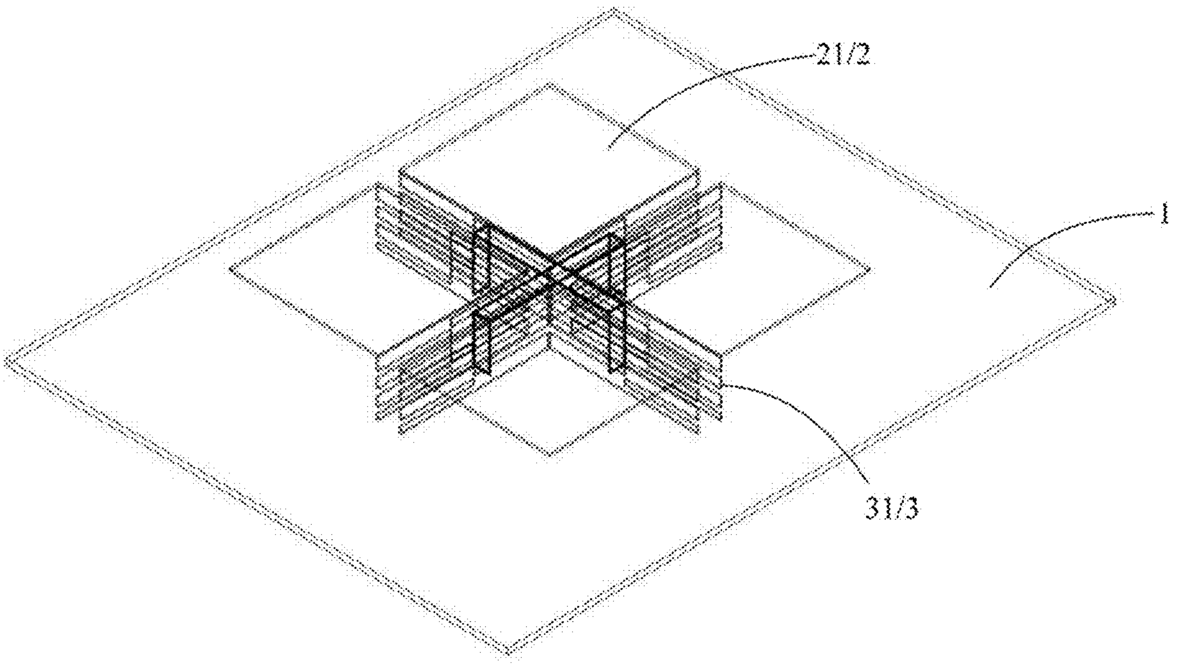
FIG. 1 is an elevation of a magnetoelectric dipole antenna according to an embodiment of the present disclosure.
Figure 2:
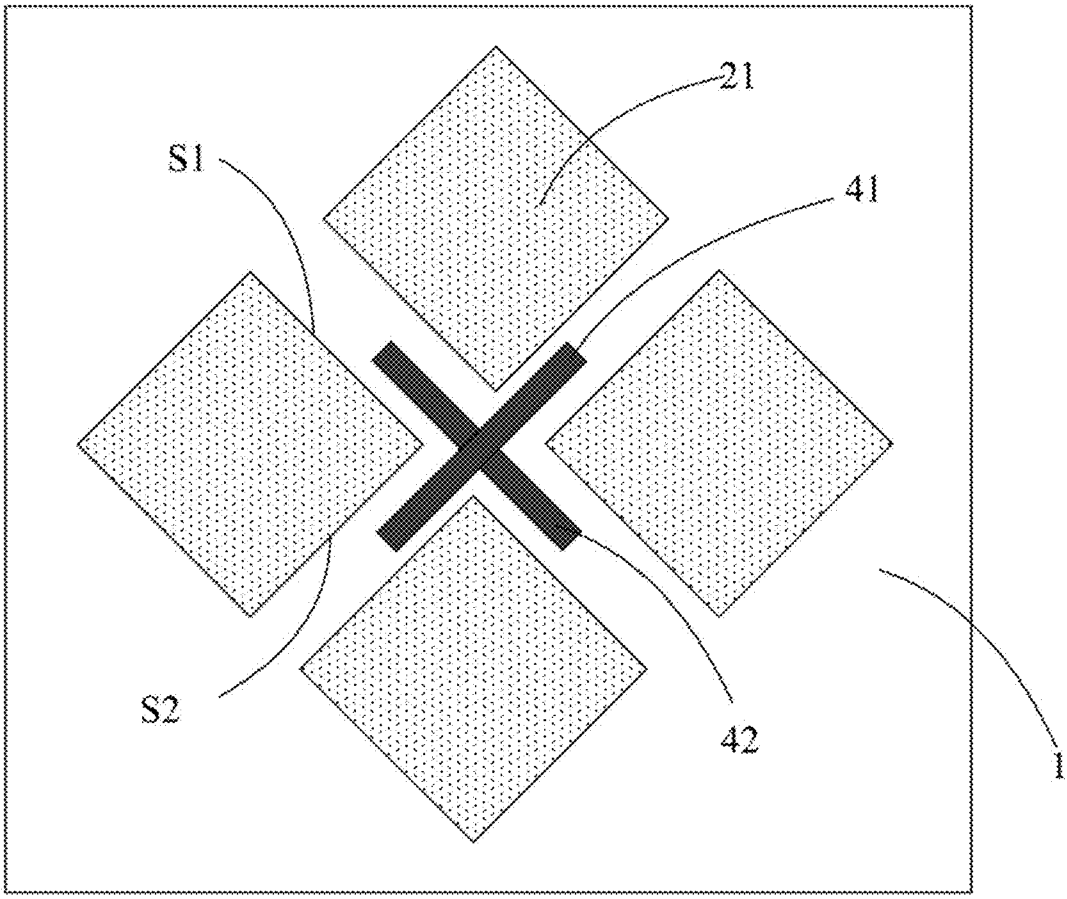
FIG. 2 is a top view of a magnetoelectric dipole antenna according to an embodiment of the present disclosure.
Figure 3:
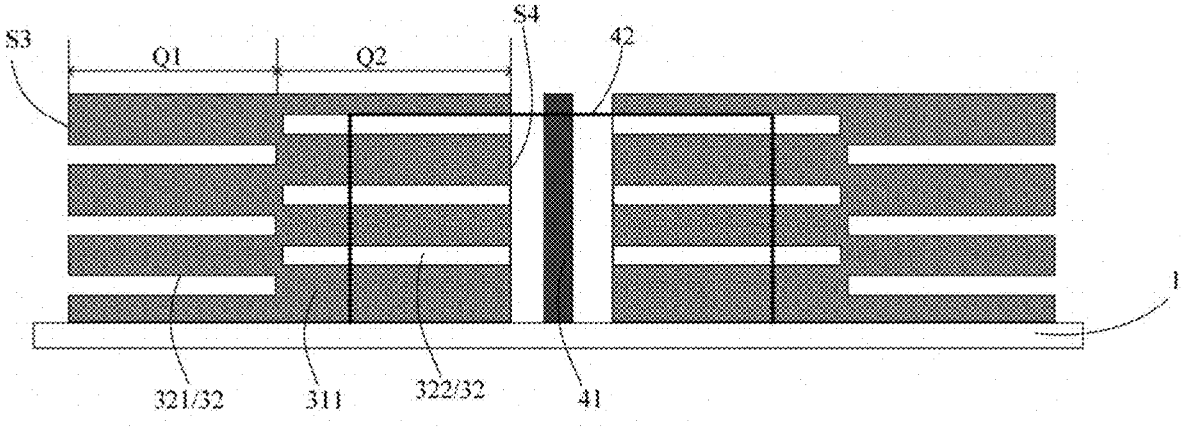
FIG. 3 is a side view of a magnetoelectric dipole antenna according to an embodiment of the present disclosure.

FIG. 1 is an elevation of a magnetoelectric dipole antenna according to an embodiment of the present disclosure; FIG. 2 is a top view of a magnetoelectric dipole antenna according to an embodiment of the present disclosure; and FIG. 3 is a side view of a magnetoelectric dipole antenna according to an embodiment of the present disclosure. In a first aspect, as shown in FIGS. 1 to 3, an embodiment of the present disclosure provides a dual-polarized magnetoelectric dipole antenna, which includes a reflection plate 1, a magnetic dipole 3 arranged on the reflection plate 1 and connected to the reflection plate 1, and an electric dipole 2 located on a side of the magnetic dipole 3 away from the reflection plate 1. The magnetic dipole 3 is arranged vertically with respect to the reflection plate 1, and the electric dipole 2 is arranged horizontally with respect to the reflection plate 1. FIG. 1 in the embodiment of the present disclosure only exemplifies that the magnetoelectric dipole antenna can realize polarization directions of ±45°.

With continued reference to FIG. 1, the electric dipole 2 includes four first electrodes 21, each of the four first electrodes 21 includes a first side S1 and a second side S2 connected to each other. The first side S1 of any one first electrode 21 is adjacent to the first side S1 of one first electrode 21 adjacent to this first electrode 21, the second side S2 of this first electrode 21 is adjacent to the second side S2 of another first electrode 21 adjacent to this first electrode 21. The magnetic dipole 3 includes four second electrodes 31, which are arranged in one-to-one correspondence with the first electrodes 21. Each of the four second electrodes 31 includes two sub-electrodes 311, and the two sub-electrodes 311 are connected to the first side S1 and the second side S2 of a corresponding first electrode 21, respectively. In the embodiment of the present disclosure, each sub-electrode 311 is provided with a slit opening 32, and an extending direction of the slit opening 32 is parallel to a plane where the reflection plate 1 is located.

Since the slit opening 32 is arranged in the sub-electrode 311 of the magnetic dipole 3 in the embodiment of the present disclosure, when a radio frequency signal is fed into the dipole, a current path can be lengthened, and a profile of the antenna can be reduced from $0.24\lambda_0$ to $0.13\lambda_0$. In addition, with the magnetic dipole antenna in the embodiment of the present disclosure, performance advantages of the antenna, such as broadband, high gain, low back lobe, and low cross polarization ratio is maintained, while reducing the profile of the antenna.

In some examples, the reflection plate 1 is made of metal material. That is, the magnetoelectric dipole antenna provided by the embodiment of the present disclosure is an all-metal antenna.

In some examples, the magnetic dipole antenna in the embodiment of the present disclosure includes not only the above-described structure but also a first feed line 41 and a second feed line 42. Specifically, four magnetic dipoles 3 define a cross-shaped accommodation region, and the first feed line 41 and the second feed line 42 are crossed with each over and located in the cross-shaped accommodation region.

Specifically, each of the first feed line 41 and the second feed line 42 is a Γ-shaped feed line. That is, the first and second feed lines 41 and 42 each include three feed line segments, that is, a first feed line segment, a second feed line segment, and a third feed line segment. The first feed line segment and the third feed line segment are vertically arranged with respect to the reflection plate 1, and the second feed line segment is connected between the first feed line segment and the third feed line segment and is arranged parallel to the reflection plate 1. The energy transfer in the first feed line 41 is taken as an example. The first feed line segment of the first feed line 41 and the sub-electrodes 311 of the two second electrodes 31 respectively located on two sides of the first feed line segment form an air microstrip line, to transmit energy to the second feed line segment of the first feed line 41, and the second feed line segment of the first feed line 41 simultaneously excites the horizontal electric dipole 2 and the vertical magnetic dipole 3 through electromagnetic coupling, so that the second feed line segment appears in inductor characteristics. By adjusting the sizes of the second feed line segment and the third feed line segment, impedance matching can be performed on the antenna. In order to increase the isolation of the antenna, the second feed line segment of the first feed line 41 and the second feed line segment of the second feed line 4, which are orthogonal to each other, are spaced apart from each other in a direction perpendicular to the reflection plate 1 by a distance in a range of about 0.8 mm to 1.2 mm, for example, 1 mm.

Furthermore, the magnetoelectric dipole antenna further includes a first radio frequency connector and a second radio frequency connector. The first radio frequency connector is connected to the first feed line segment of the first feed line 41, for feeding a radio frequency signal into the first feed line 41. The second radio frequency connector is connected to the first feed line segment of the second feed line 42, for feeding a radio frequency signal into the second feed line 42. The first radio frequency connector and the second radio frequency connector each may be a SMA (Small A type) joint.

In order to make the structure of the dual-polarized magnetoelectric dipole antenna in the embodiment of the present disclosure clearer, the dual-polarized magnetoelectric dipole antenna is described below with reference to specific examples. It should be noted that, in each of the following examples, the dual-polarized magnetoelectric dipole antenna is an antenna having polarization directions of ±45°. Each antenna includes the reflection plate 1, the magnetic dipole 3, the electric dipole 2, and the first and second feed lines 41 and 42 orthogonal to each other, which are described above. The difference between the examples mainly lies in an arrangement of the slit opening 32 in the sub-electrode 311 of the magnetic dipole 3 and an arrangement of a hollowed-out pattern 22 in the first electrode 21 of the electric dipole 2. Each of the first feed line 41 and the second feed line 42 adopts the Γ-shaped feed line described above, and therefore, the description thereof is not repeated in the following examples.

A first example is as follows. Referring to FIGS. 1 to 3, an overall height of the magnetoelectric dipole antenna is 11 mm (0.13$\lambda_0$), each of the four first electrodes 21 of the electric dipole 2 is a square patch, and a length of the side of each square patch is 26 mm. Each of the sub-electrodes 311 of the second electrode 31 of the magnetic dipole 3 includes a plurality of slit openings 32, each of which extends in a direction parallel to the plane where the reflection plate 1 is located. The sub-electrode 311 includes a first region Q1 and a second region Q2 arranged side by side along the extending direction of the slit openings 32. Edges of the second regions Q2 of the two sub-electrodes 311 of each second electrode 31 are connected to each other. The plurality of slit openings 32 includes first slit openings 321 and second slit openings 322. The first slit openings are arranged in the first region Q1, the second slit openings 322 are arranged in the second region Q2, and the first slit openings 321 and the second slit openings 322 are alternately arranged. The number of the first slit openings 321 and the number of the second slit openings 322 in each sub-electrode 311 are equal to each other. In FIG. 3, it is taken as an example that both of the number of the first slit openings 321 and the number of the second slit openings 322 are three. The first slit opening 321 and the second slit opening 322 are each a rectangular slit. In this embodiment, on each of two sides of a vertical metal wall of the antenna are provided three rectangular slots, and the slots on both sides are alternately arranged.

In some examples, widths and/or lengths of the respective first slit openings 321 are equal to each other. In FIG. 3, it is taken as an example that the lengths of the respective first slit opening 321 are equal to each other, and the widths of the respective first slit opening 321 are also equal to each other. Likewise, widths and/or lengths of the respective second slit openings 322 are equal to each other. In FIG. 3, it is taken as an example that the lengths of the respective first slit openings 321 are equal to each other, and the widths of the respective first slit openings 321 are also equal to each other. Furthermore, the width of the respective first slit opening 321 may be equal to the width of the respective second slit opening 322, and the length of the respective first slit openings 321 may be equal to the length of the respective second slit opening 322.

In some examples, spacings between any two adjacent first slit openings 321 are equal to each other. Similarly, spacings between any two adjacent second slit openings 322 are equal to each other. Furthermore, the spacing between the adjacent first slit openings 321 is equal to the spacing between the adjacent second slit openings 322.

In some examples, each sub-electrode 311 includes a third side S3 and a fourth side S4, which are opposite to each other in the extending direction of the slit opening 32 in the sub-electrode 311, and the first slit opening 321 in each sub-electrode 311 penetrates through the third side S3. Similarly, the second slit opening 322 in each sub-electrode 311 penetrates through the fourth side S4. It should be noted that, since the number and the position of the slit openings 32 in each sub-electrode 311 have a certain influence on the performance of the antenna, the number and the position of the first slit openings 321 and the second slit openings 322 can be specifically designed in an actual product.

Figure 4:
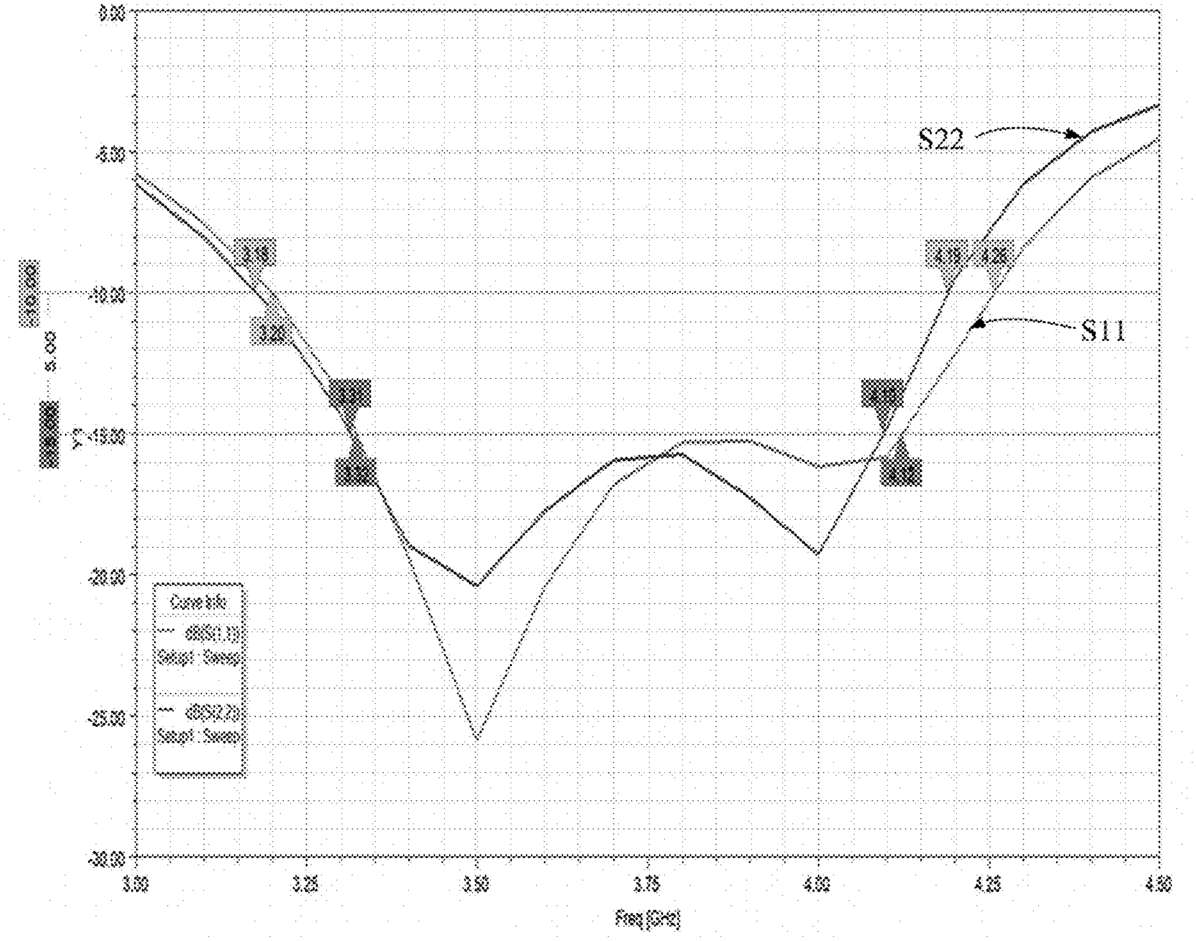
FIG. 4 shows a S11 curve of a magnetoelectric dipole antenna in a first example.
Figure 5:
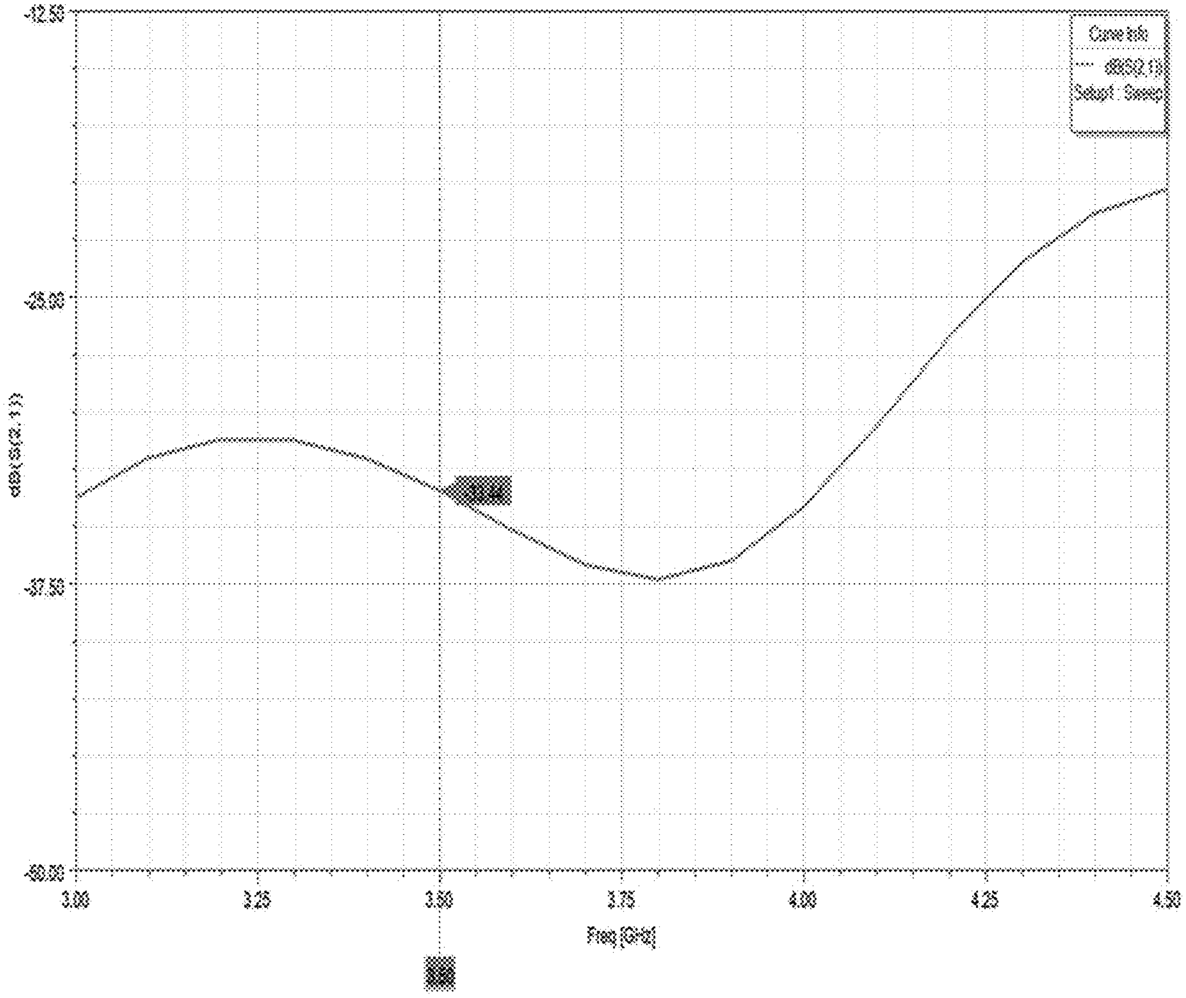
FIG. 5 shows a S21 curve of a magnetoelectric dipole antenna in a first example.
Figure 6:
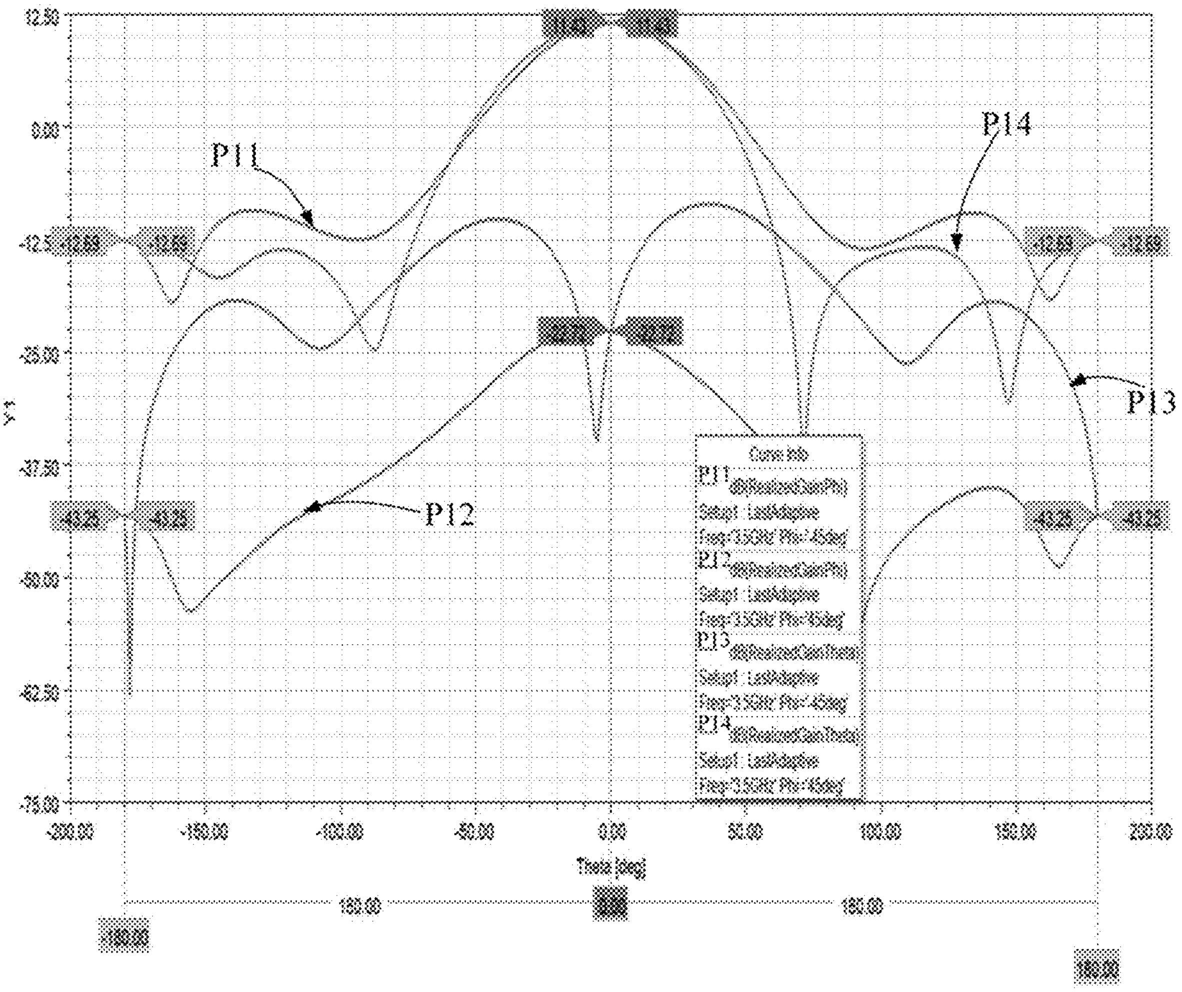
FIG. 6 shows a radiation pattern of a magnetoelectric dipole antenna at Port1 and at a frequency of 3.5 GHz in a first example.
Figure 7:
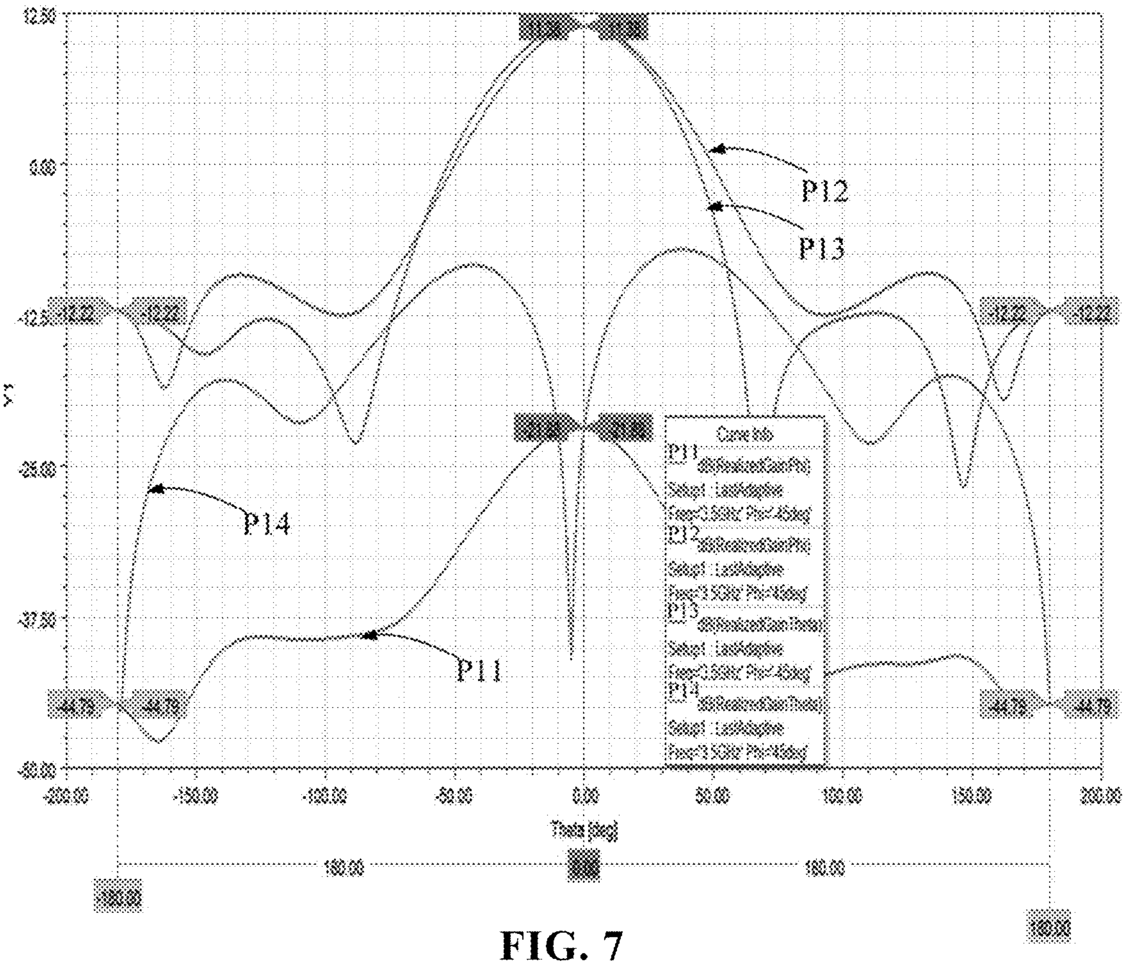
FIG. 7 shows a radiation pattern of a magnetoelectric dipole antenna at Port2 and at a frequency of 3.5 GHz in a first example.

In order to make the performance of the magnetoelectric dipole antenna shown in FIG. 1 clearer, the antenna is simulated, and the advantages of the antenna in the embodiment of the present disclosure can be visually seen from the simulation result. FIG. 4 shows a S11 curve of the magnetoelectric dipole antenna in the first example; FIG. 5 shows a S21 curve of the magnetoelectric dipole antenna in the first example; FIG. 6 shows a radiation pattern of the magnetoelectric dipole antenna at Port1 and at a frequency of 3.5 GHz in the first example; and FIG. 7 shows a radiation pattern of the magnetoelectric dipole antenna at Port2 and at a frequency of 3.5 GHz in the first example. As shown in FIGS. 4 to 7, it can be seen that the −15 dB impedance bandwidths of the two ports, i.e. Port1 and Port2 (the first feed line segment of the first feed line 41 and the first feed line segment of the second feed line 42), of the antenna are 0.8 GHz (3.32 GHz to 4.12 GHz) and 0.79 GHz (3.31 GHz to 4.10 GHz), respectively; the gains of the two ports at the center frequency point (3.5 GHz) are 11.43 dBi and 11.38 dBi, respectively; the port isolation is −33.44 dB; the cross polarization ratios are 34.15 dB and 33.26 dB, respectively; and the front-to-back ratios are 24.12 dB and 23.6 dB, respectively. Therefore, it can be shown that, through forming a slot in the vertical wall to bend the current, performance advantages of the antenna, such as broadband, high gain, low back lobe, and low cross polarization ratio can be maintained, while reducing the profile of the antenna.

Figure 8:
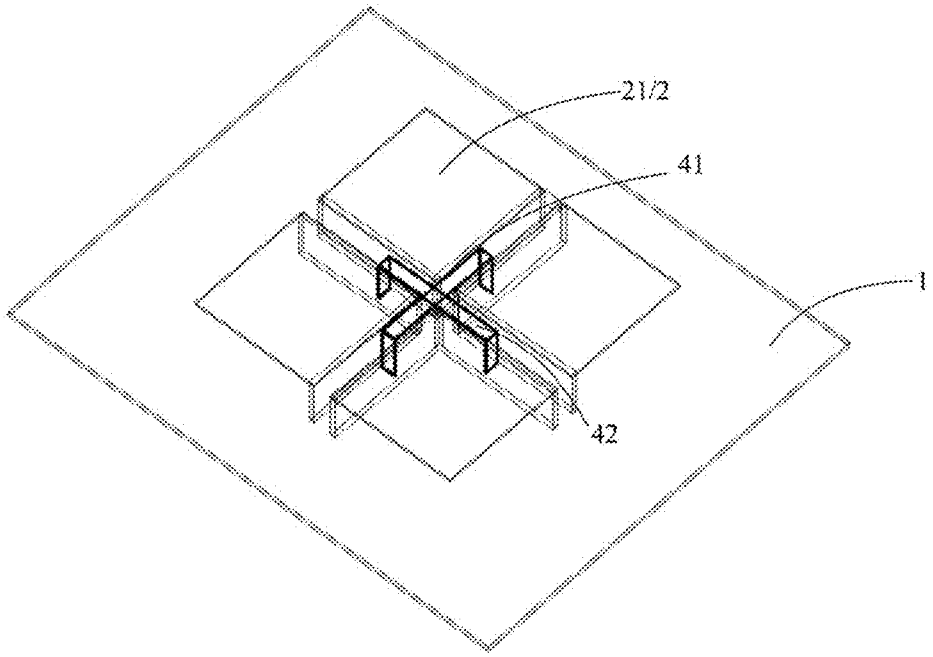
FIG. 8 is an elevation of a magnetoelectric dipole antenna in a second example of an embodiment of the present disclosure.
Figure 9:
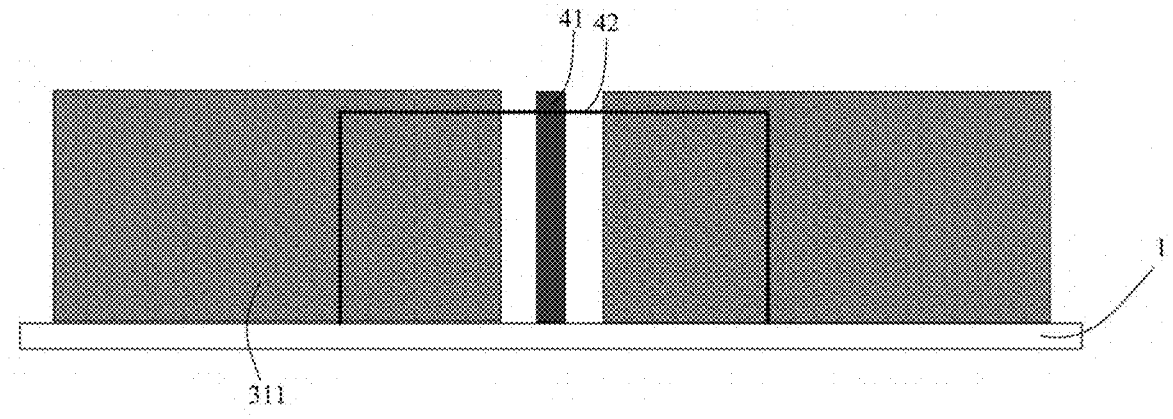
FIG. 9 is a side view of a magnetoelectric dipole antenna in a second example of an embodiment of the present disclosure.

A second example is as follows. FIG. 8 is an elevation of the magnetoelectric dipole antenna in the second example of the embodiment of the present disclosure; and FIG. 9 is a side view of the magnetoelectric dipole antenna in the second example of the embodiment of the present disclosure. As shown in FIGS. 8 and 9, this example is different from the first example in that no slit opening 32 is provided in any sub-electrode 311 of the second electrode 31 of the magnetic dipole 3. The overall height of the antenna is 21 mm (0.24$\lambda_0$), and the rest of the structure is the same as that in the first example, and therefore, the description thereof is not repeated herein.

Figure 10:
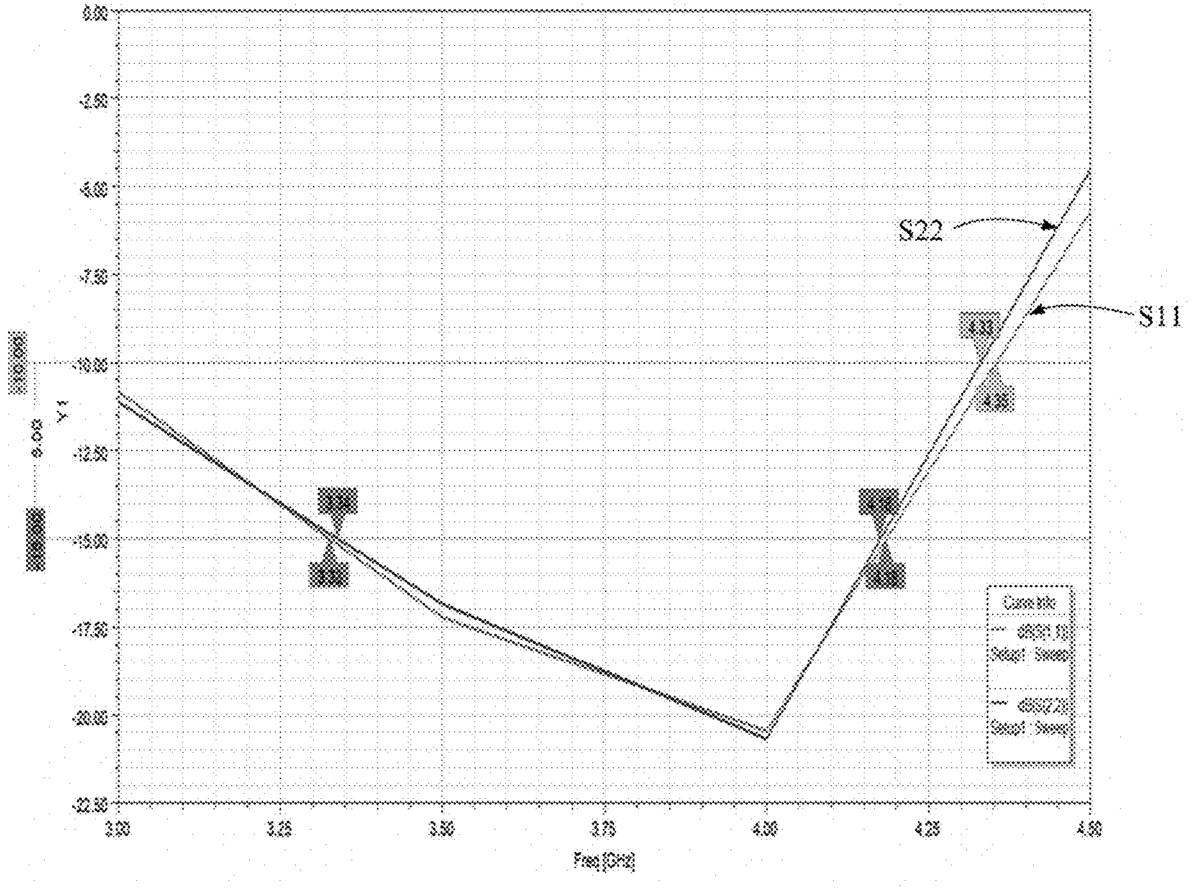
FIG. 10 shows a S11 curve of a magnetoelectric dipole antenna in a second example.
Figure 11:
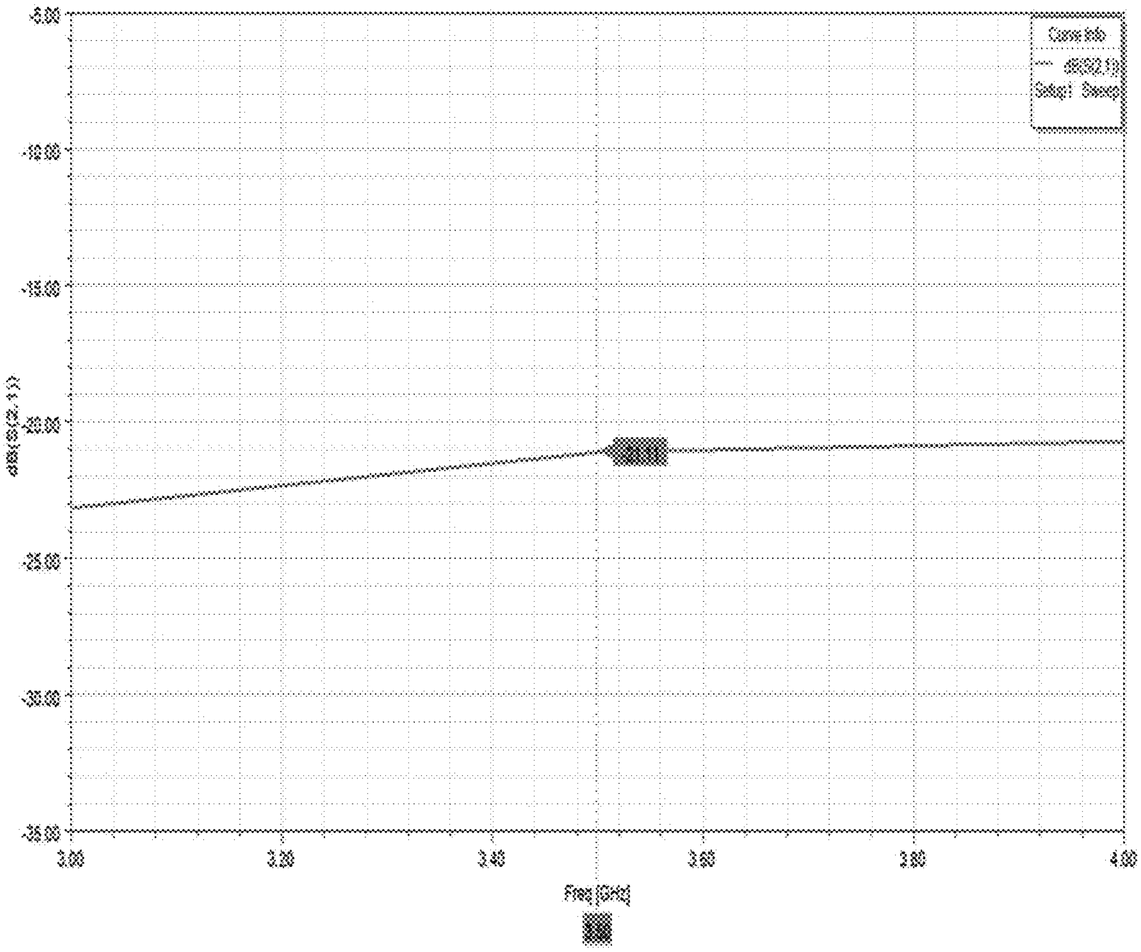
FIG. 11 shows a S21 curve of a magnetoelectric dipole antenna in a second example.
Figure 12:
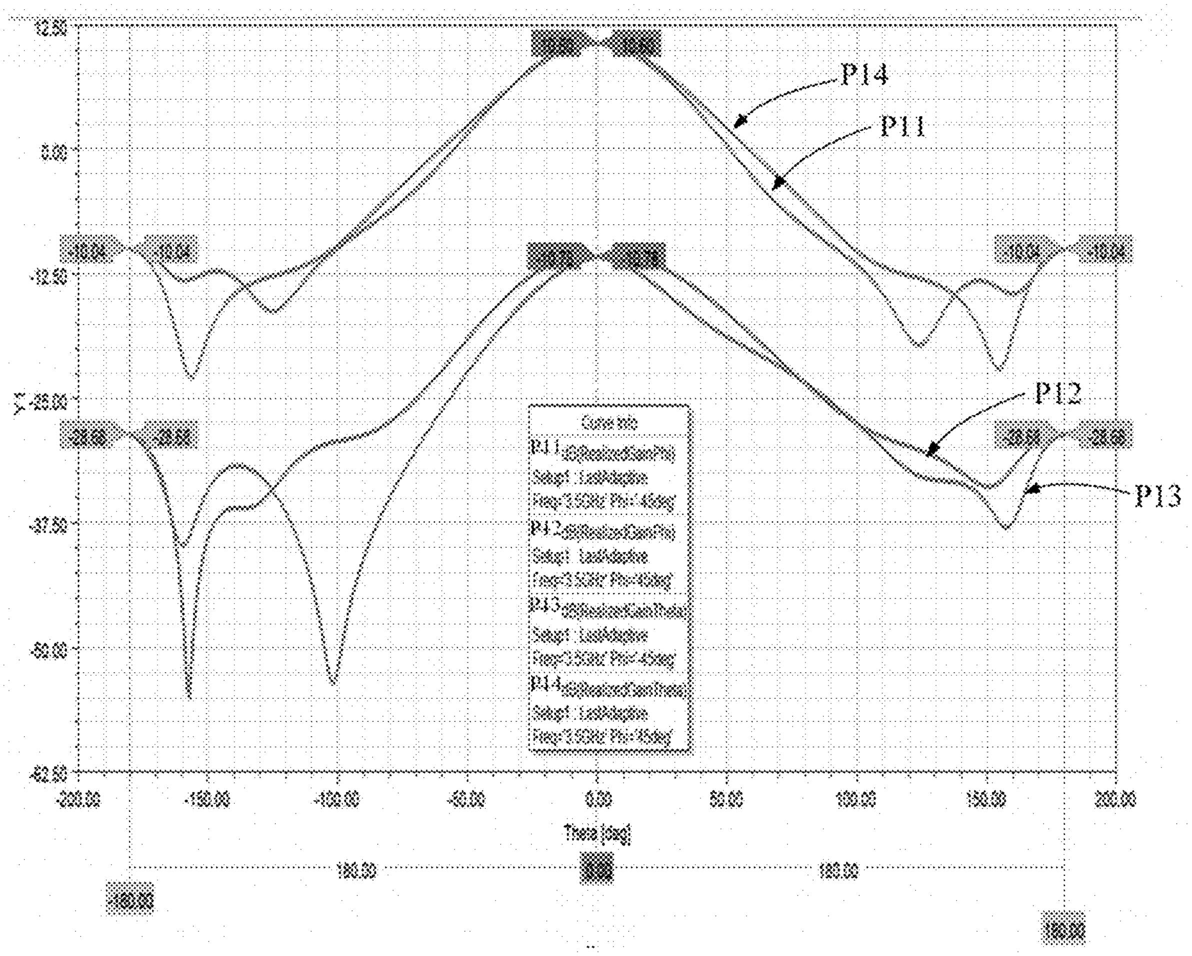
FIG. 12 shows a radiation pattern of a magnetoelectric dipole antenna at Port1 and at a frequency of 3.5 GHz in a second example.
Figure 13:
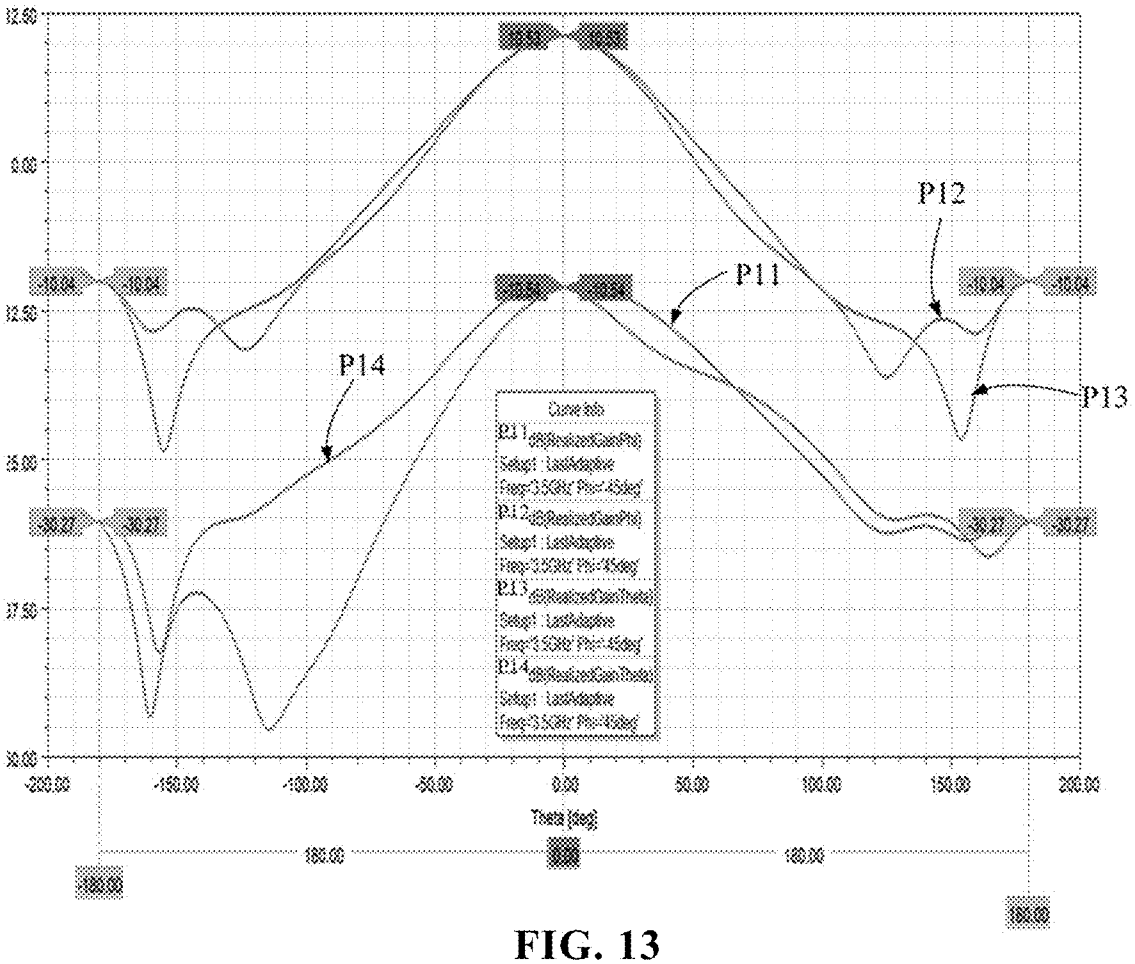
FIG. 13 shows a radiation pattern of a magnetoelectric dipole antenna at Port2 and at a frequency of 3.5 GHz in a second example.

In order to make the performance of the magnetoelectric dipole antenna shown in FIG. 8 clearer, the antenna is simulated. FIG. 10 shows a S11 curve of the magnetoelectric dipole antenna in the second example; FIG. 11 shows a S21 curve of the magnetoelectric dipole antenna in the second example; FIG. 12 shows a radiation pattern of the magnetoelectric dipole antenna at Port1 and at a frequency of 3.5 GHz in the second example; and FIG. 13 shows a radiation pattern of the magnetoelectric dipole antenna at Port2 and at a frequency of 3.5 GHz in the second example. As shown in FIGS. 10 to 13, it can be seen that the −15 dB impedance bandwidths of the two ports, i.e. Port1 and Port2, of the antenna are 0.85 GHz (3.33 GHz to 4.18 GHz) and 0.84 GHz (3.34 GHz to 4.18 GHz), respectively; the gains of the two ports at the center frequency point (3.5 GHz) are 10.60 dBi and 10.53 dBi, respectively; the port isolation is −21.11 dB; the cross polarization ratios are 21.38 dB and 21.07 dB, respectively; and the front-to-back ratios are 20.64 dB and 20.57 dB, respectively. Compared with the first example, no slit opening 32 is provided in any sub-electrode 311 of the second electrode 31 of the magnetic dipole 3, and this antenna has a higher profile. Although the impedance bandwidth of this antenna is slightly wider than the low-profile magnetoelectric dipole antenna in the first example, the gain, the port isolation, the cross polarization ratio, and the front-to-back ratio of this antenna are slightly worse than those of the antenna in the first example, respectively.

Figure 14:
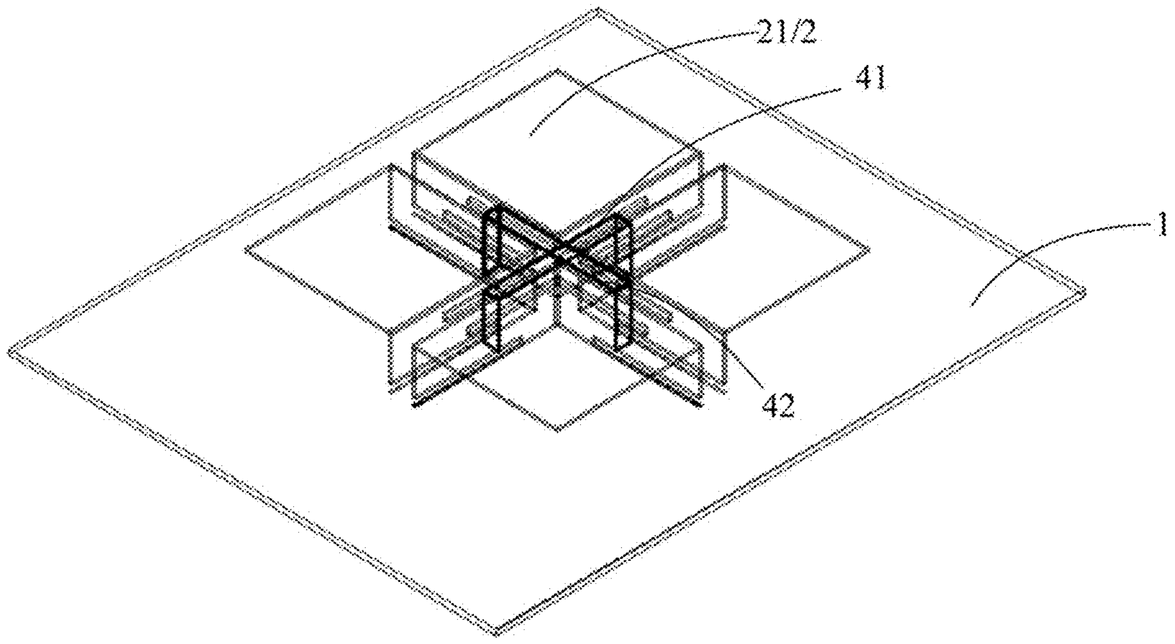
FIG. 14 is an elevation of a magnetoelectric dipole antenna in a third example of an embodiment of the present disclosure.
Figure 15:
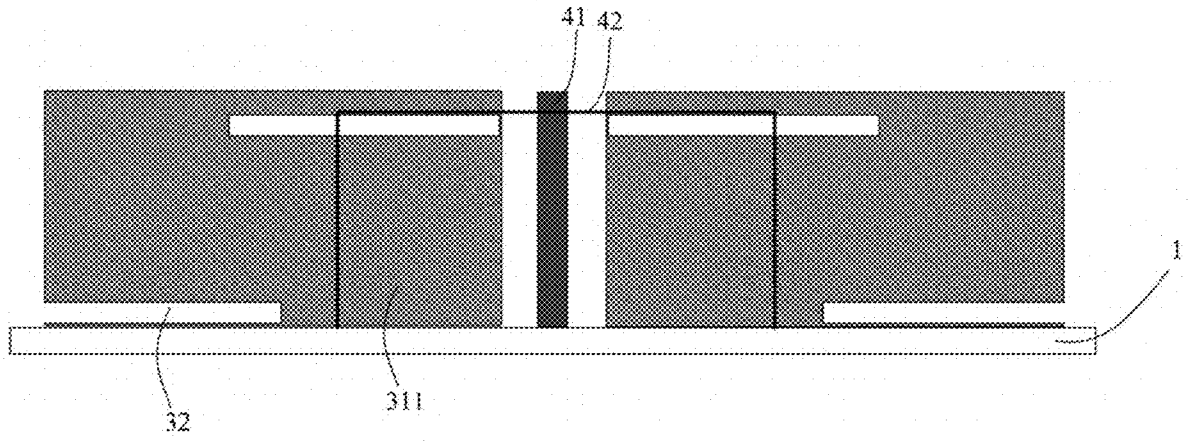
FIG. 15 is a side view of a magnetoelectric dipole antenna in a third example of an embodiment of the present disclosure.

A third example is as follows. FIG. 14 is an elevation of the magnetoelectric dipole antenna in the third example of the embodiment of the present disclosure; and FIG. 15 is a side view of the magnetoelectric dipole antenna in the third example of the embodiment of the present disclosure. As shown in FIGS. 14 to 15, the magnetoelectric dipole antenna in this example is substantially the same in structure as the first example, except that in this example, each sub-electrode 311 includes only two slit openings 32, and the slit openings 32 are each a rectangular slit. The two slit openings 32 in each sub-electrode 311 are formed on two sides of the sub-electrode 311 in a direction perpendicular to the reflection plate 1, respectively. Orthographic projections of the two slit openings 32 of each sub-electrode 311 on the reflection plate 1 partially overlap each other. The rest of the structure is the same as that in the first example, and therefore, the description thereof is not repeated herein.

Figure 16:
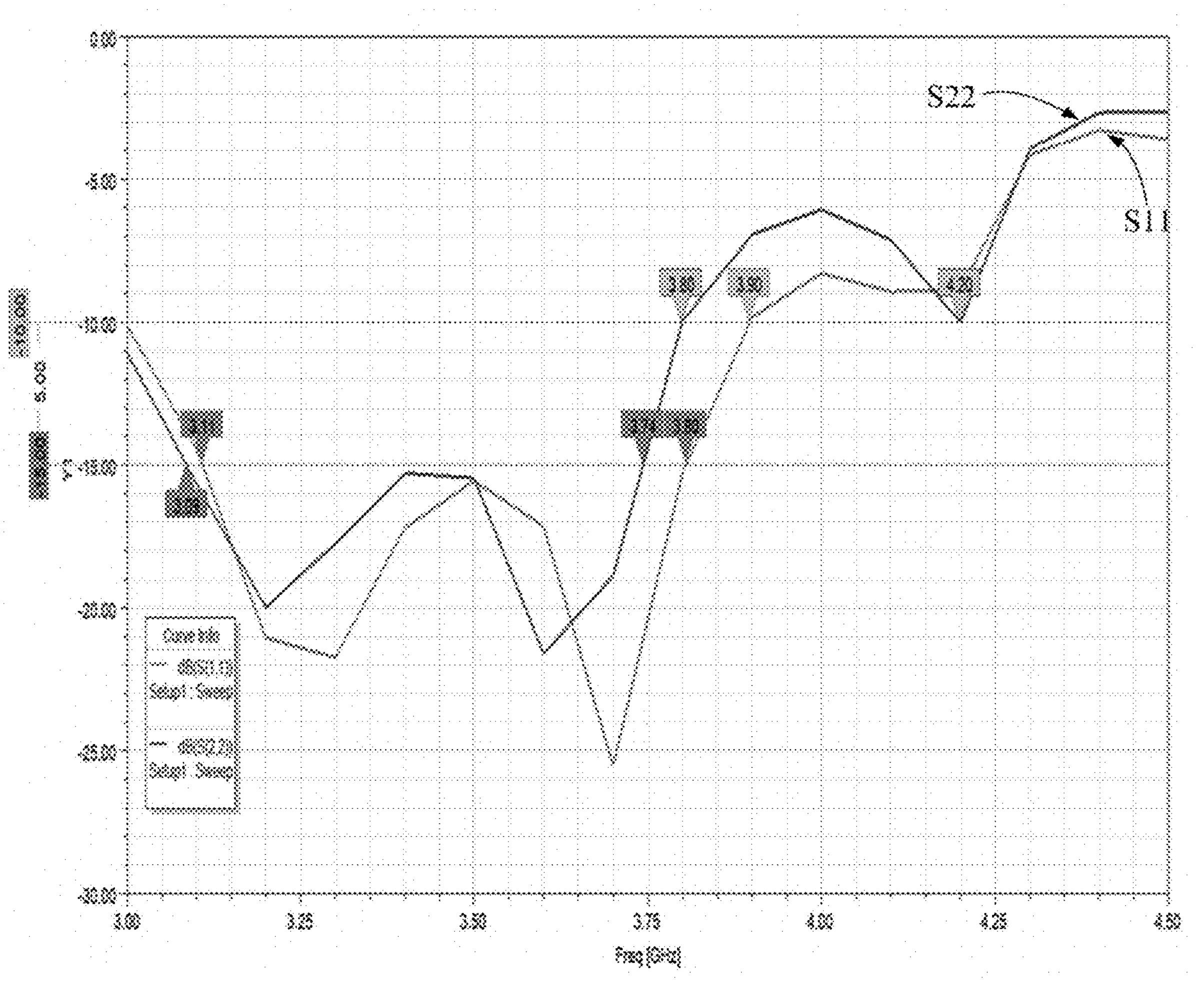
FIG. 16 shows a S11 curve of a magnetoelectric dipole antenna in a third example.
Figure 17:
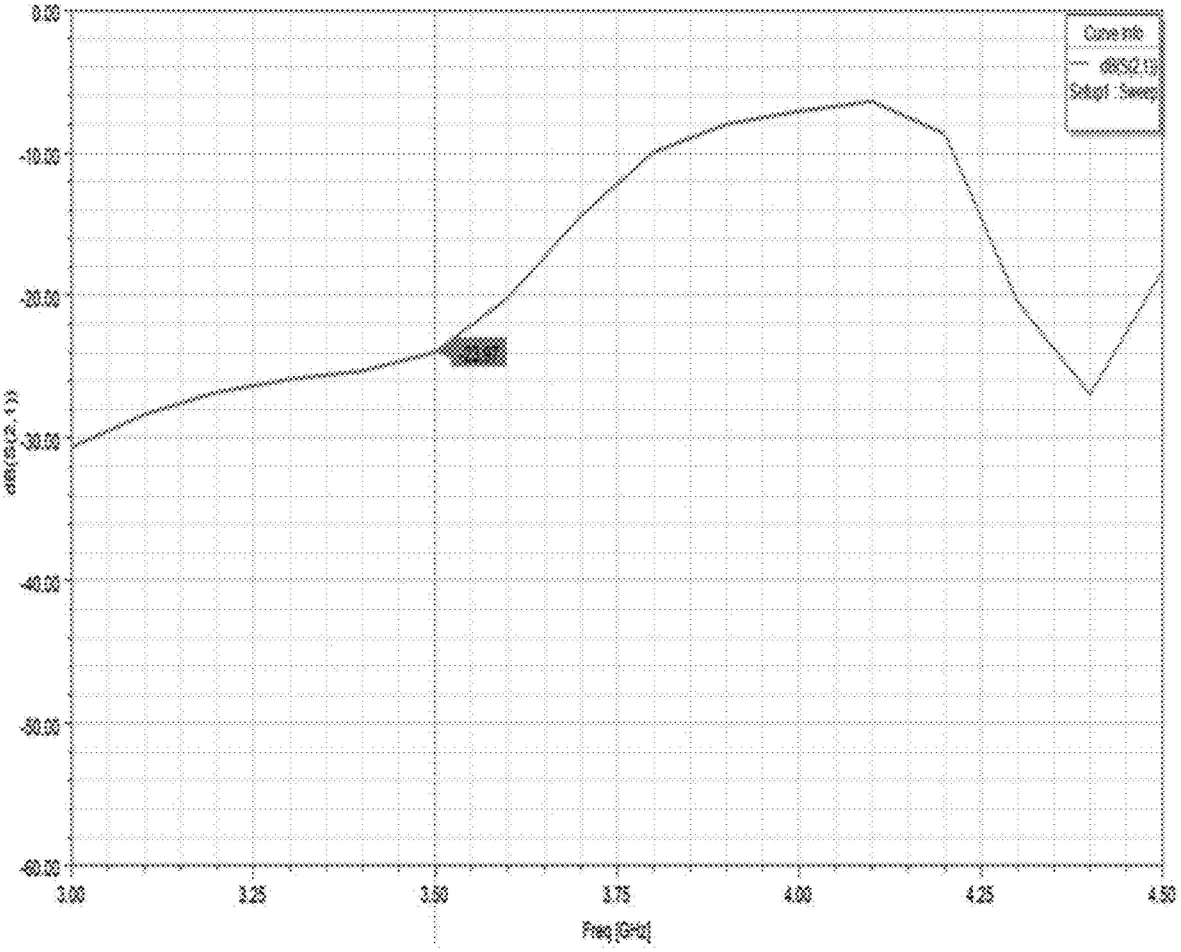
FIG. 17 shows a S21 curve of a magnetoelectric dipole antenna in a third example.
Figure 18:
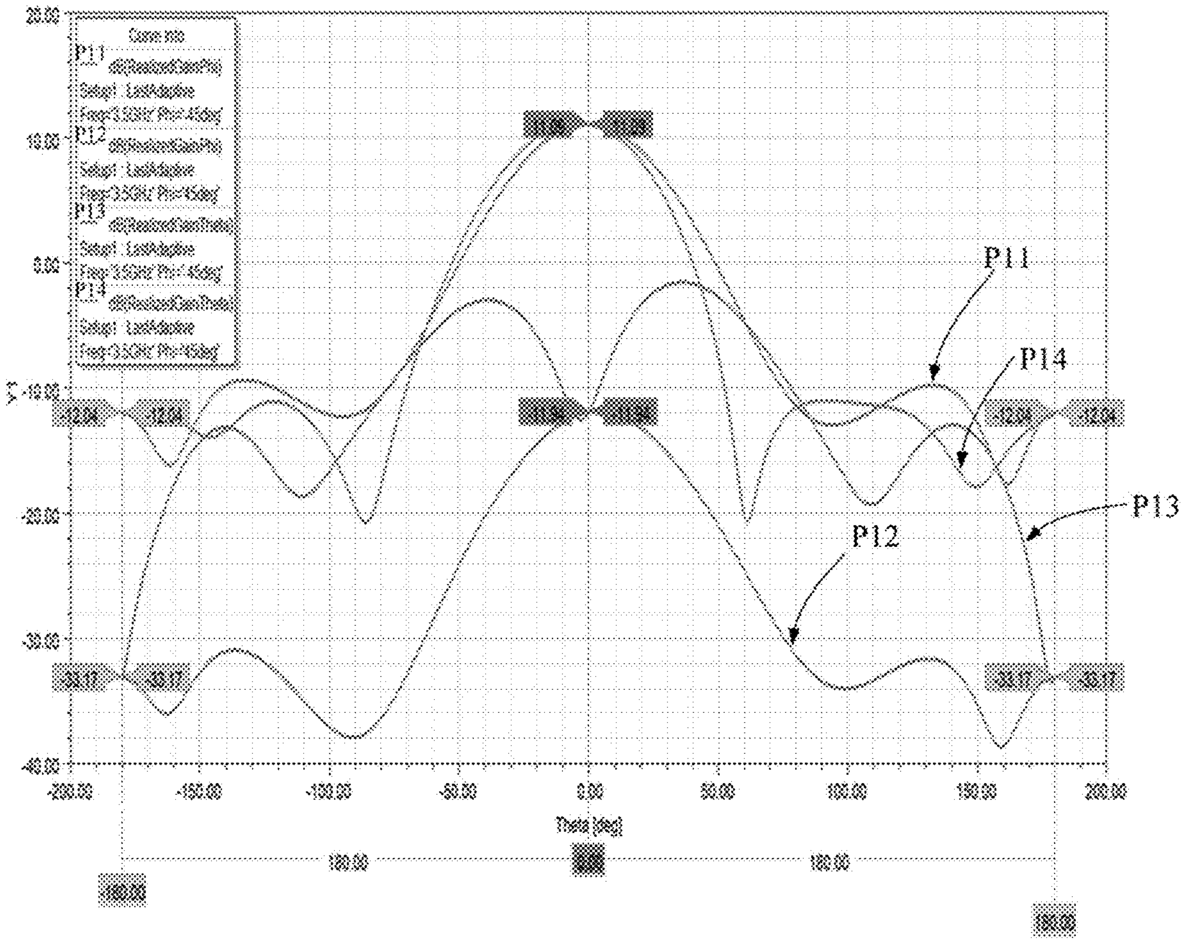
FIG. 18 shows a radiation pattern of a magnetoelectric dipole antenna at Port1 and at a frequency of 3.5 GHz in a third example.
Figure 19:
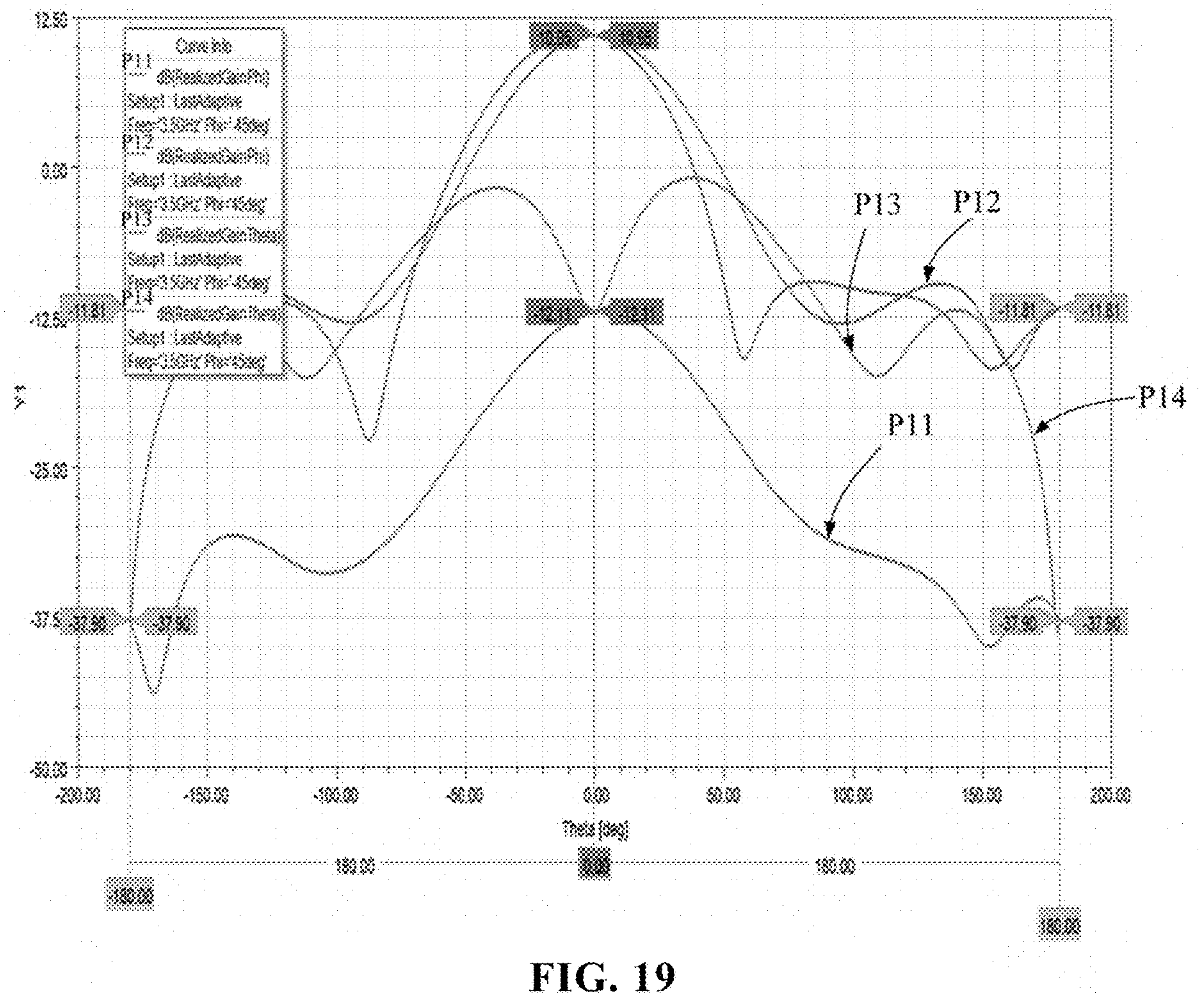
FIG. 19 shows a radiation pattern of a magnetoelectric dipole antenna at Port2 and at a frequency of 3.5 GHz in a third example.

In order to make the performance of the magnetoelectric dipole antenna shown in FIG. 14 clearer, the antenna is simulated, and the advantages of the antenna in the embodiment of the present disclosure can be visually seen from the simulation result. FIG. 16 shows a S11 curve of the magnetoelectric dipole antenna in the third example; FIG. 17 shows a S21 curve of the magnetoelectric dipole antenna in the third example; FIG. 18 shows a radiation pattern of the magnetoelectric dipole antenna at Port1 and at a frequency of 3.5 GHz in the third example; and FIG. 19 shows a radiation pattern of the magnetoelectric dipole antenna at Port2 and at a frequency of 3.5 GHz in the third example. As shown in FIGS. 16 to 19, it can be seen that the −15 dB impedance bandwidths of the two ports, i.e. Port1 and Port2, of the antenna are 0.69 GHz (3.11 GHz to 3.80 GHz) and 0.65 GHz (3.09 GHz to 3.74 GHz), respectively; the gains of the two ports at the center frequency point (3.5 GHz) are 11.09 dBi and 10.95 dBi, respectively; the port isolation is −23.97 dB; the cross polarization ratios are 23.03 dB and 23.06 dB, respectively; and the front-to-back ratios are 23.13 dB and 22.76 dB, respectively. Compared with the first example, the number of slit openings 32 in this example is reduced. The profile of the antenna can be reduced, but the impedance bandwidth of the antenna is reduced, and the gain, the port isolation, the cross polarization ratio, and the front-to-back ratio of the antenna are worse than those of the antenna in the first example, respectively.

Figure 20:
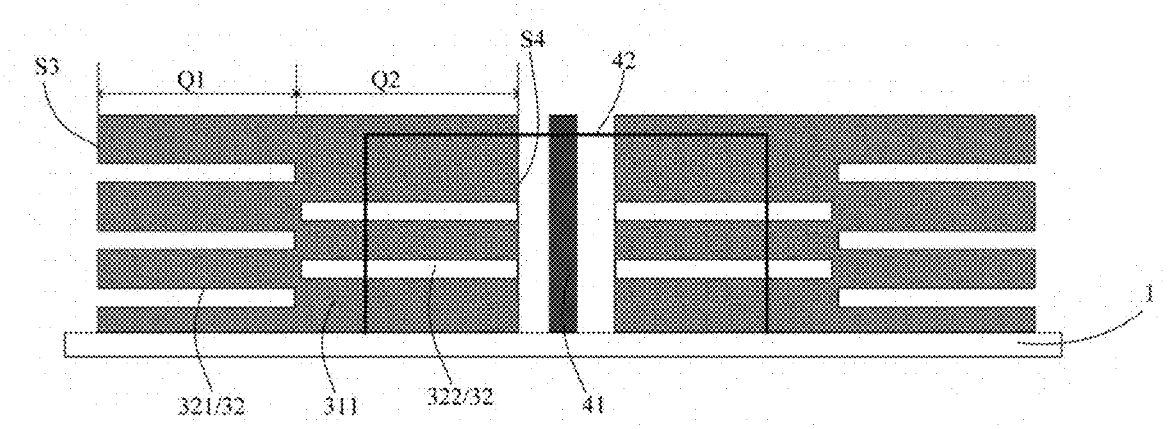
FIG. 20 is a side view of a magnetoelectric dipole antenna in a fourth example of an embodiment of the present disclosure.

A fourth example is as follows. FIG. 20 is a side view of the magnetoelectric dipole antenna in the fourth example of the embodiment of the present disclosure. As shown in FIG. 20, the magnetoelectric dipole antenna in this example is substantially the same in structure as the first example, except that the number of the first slit openings 321 in each sub-electrode 311 is different by one from the number of the second slit openings 322 in this sub-electrode 311. In FIG. 20, the number of the first slit openings 321 is three, the number of the second slit openings 322 is two, and the first slit openings 321 and the second slit openings 322 are alternately arranged. The rest of the structure is the same as that in the first example, and therefore, the description thereof is not repeated herein.

Figure 21:
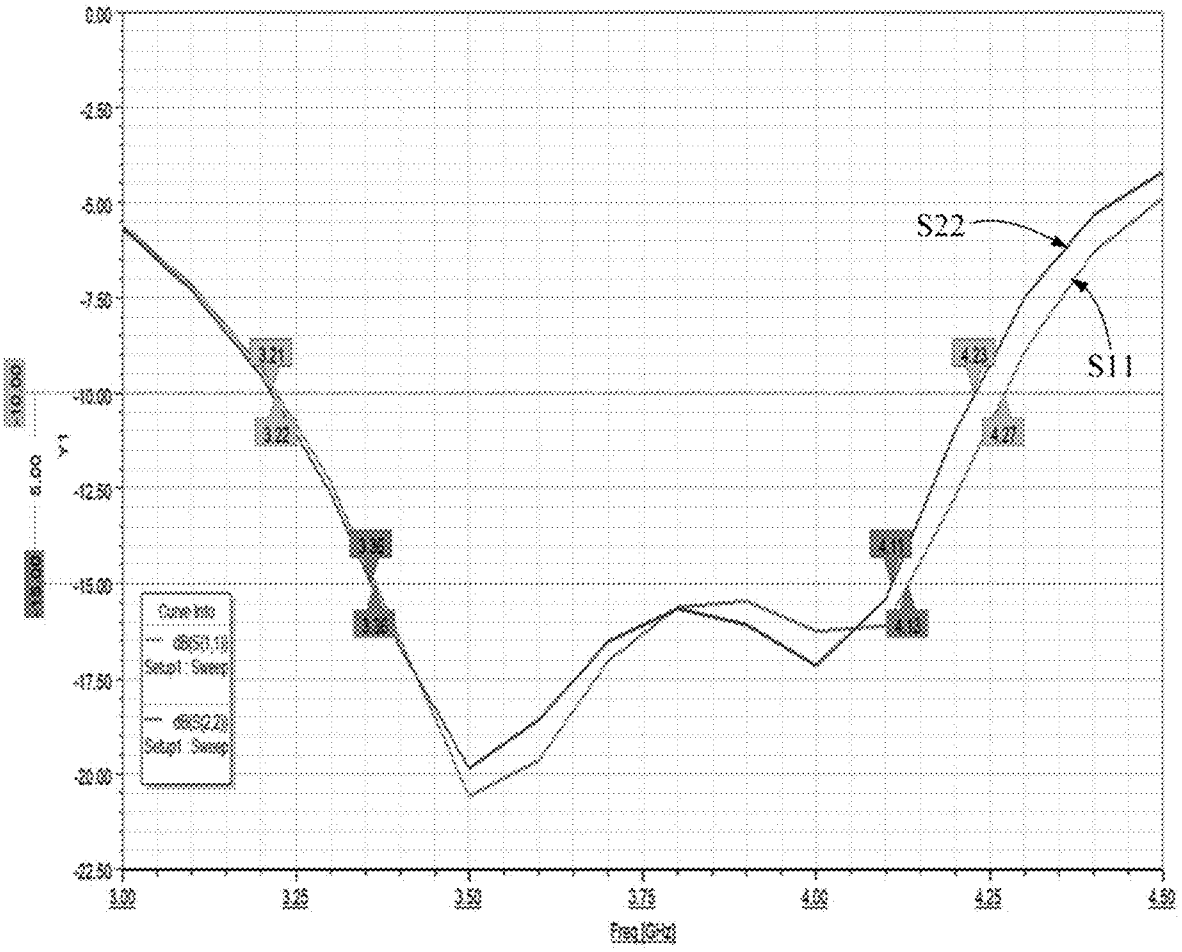
FIG. 21 shows a S11 curve of a magnetoelectric dipole antenna in a fourth example.
Figure 22:
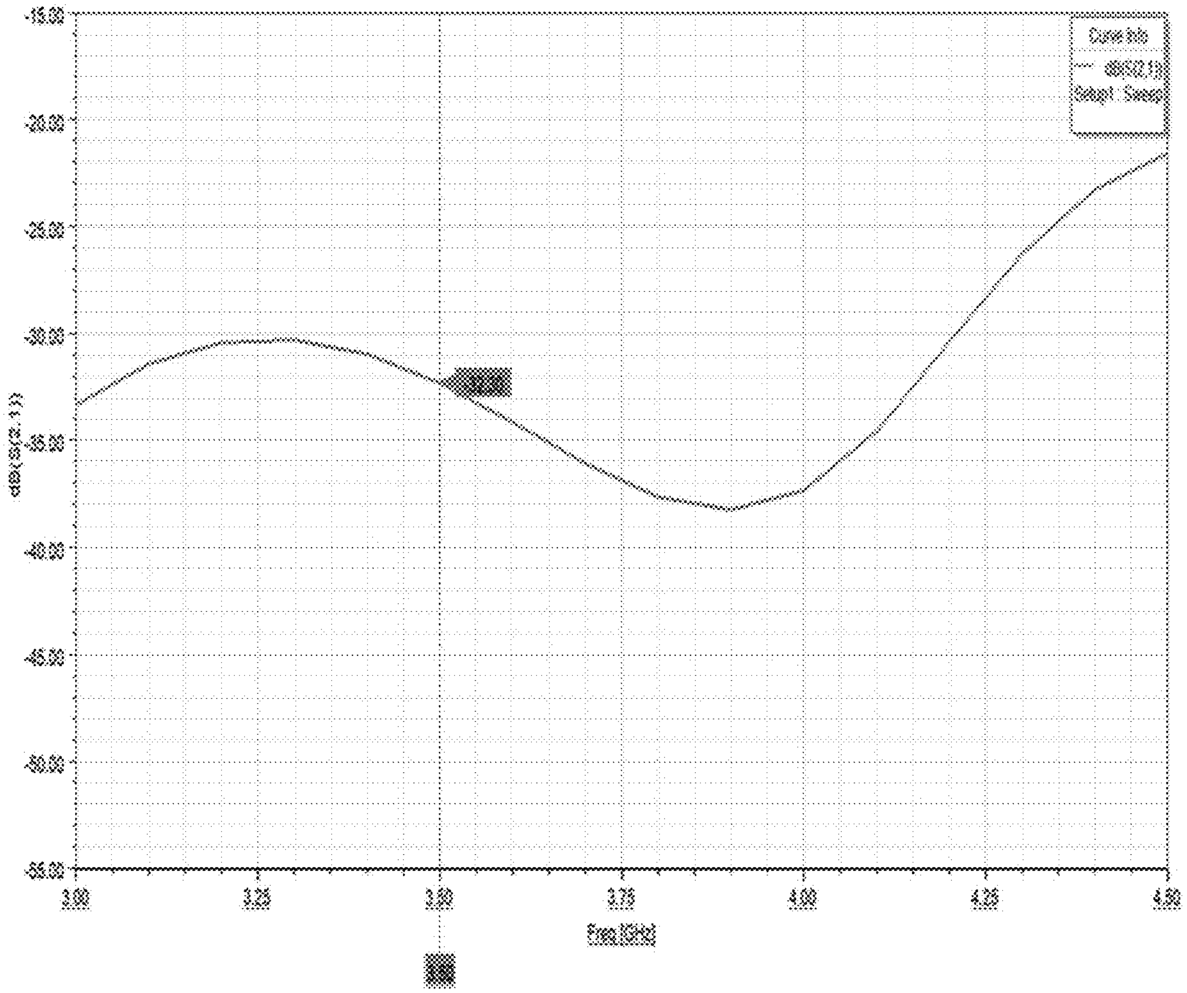
FIG. 22 shows a S21 curve of a magnetoelectric dipole antenna in a fourth example.
Figure 23:
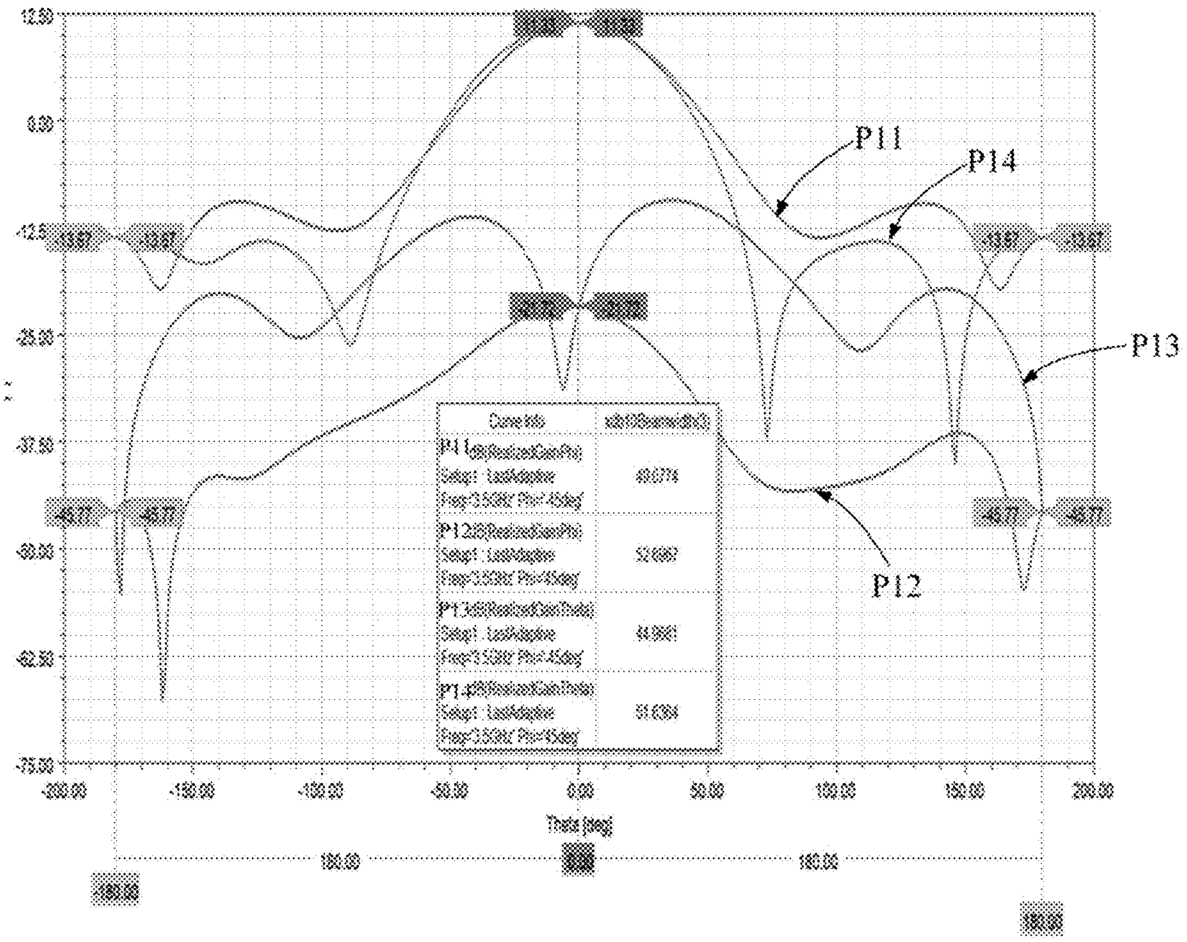
FIG. 23 shows a radiation pattern of a magnetoelectric dipole antenna at Port1 and at a frequency of 3.5 GHz in a fourth example.
Figure 24:
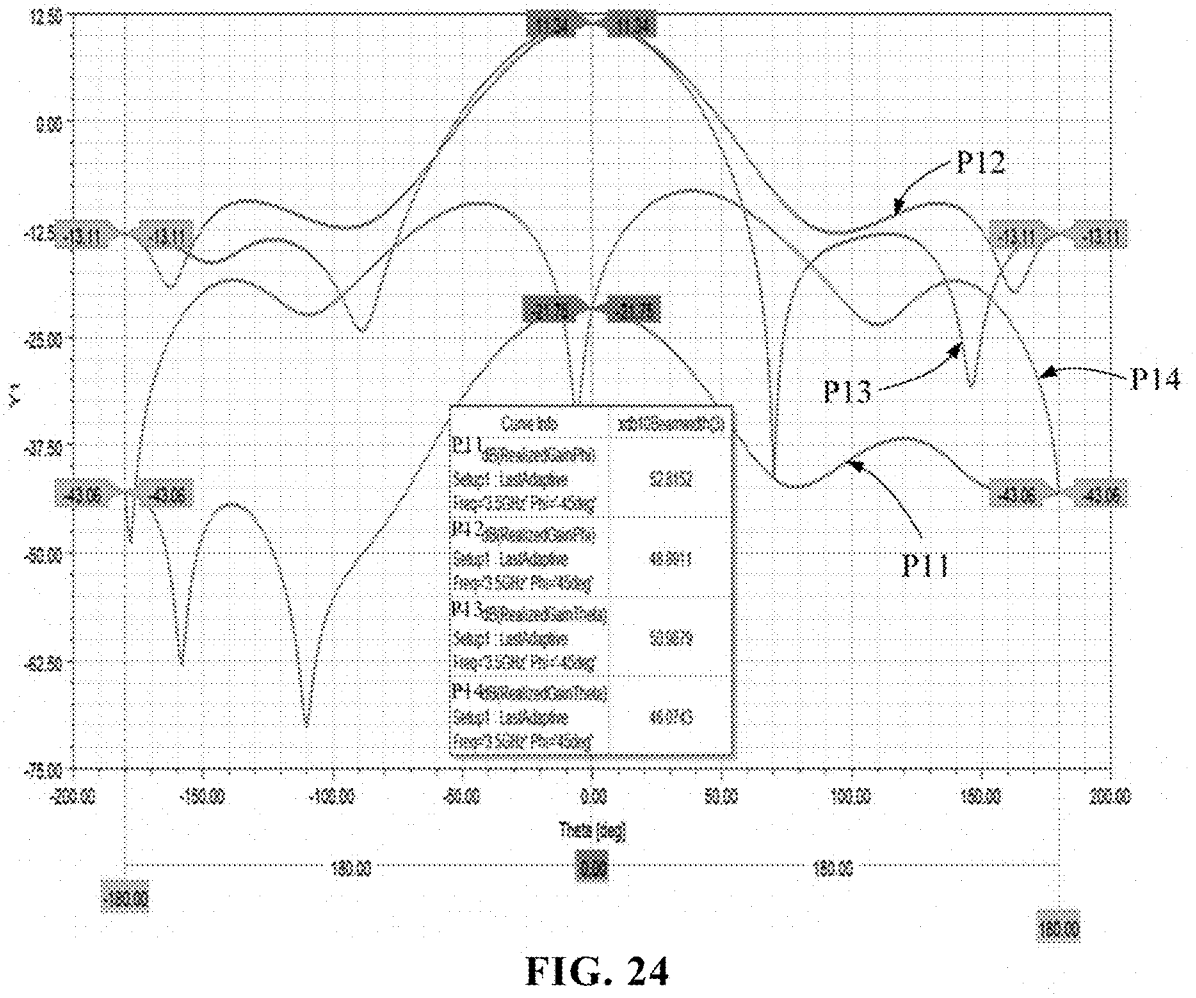
FIG. 24 shows a radiation pattern of a magnetoelectric dipole antenna at Port2 and at a frequency of 3.5 GHz in a fourth example.

In order to make the performance of the magnetoelectric dipole antenna shown in FIG. 20 clearer, the antenna is simulated, and the advantages of the antenna in the embodiment of the present disclosure can be visually seen from the simulation result. FIG. 21 shows a S11 curve of the magnetoelectric dipole antenna in the fourth example; FIG. 22 shows a S21 curve of the magnetoelectric dipole antenna in the fourth example; FIG. 23 shows a radiation pattern of the magnetoelectric dipole antenna at Port1 and at a frequency of 3.5 GHz in the fourth example; and FIG. 24 shows a radiation pattern of the magnetoelectric dipole antenna at Port2 and at a frequency of 3.5 GHz in the fourth example. As shown in FIGS. 21 to 24, it can be seen that the −15 dB impedance bandwidths of the two ports, i.e. Port1 and Port2, of the antenna are 0.77 GHz (3.36 GHz to 4.13 GHz) and 0.75 GHz (3.36-4.11 GHz), respectively; the gains of the two ports at the center frequency point (3.5 GHz) are 11.33 dBi and 11.34 dBi, respectively; the port isolation is −32.30 dB; the cross polarization ratios are 33.05 dB and 33.09 dB, respectively; and the front-to-back ratios are 25.00 dB and 24.45 dB, respectively. Compared with the first example, the slit openings 32 in the first region Q1 and the second region Q2 of the sub-electrode 311 in this example are asymmetric, and the impedance bandwidth of the antenna is slightly narrower. The gain, the port isolation, the cross polarization ratio, and the front-to-back ratio are not much different from those in the first example, respectively.

Figure 25:
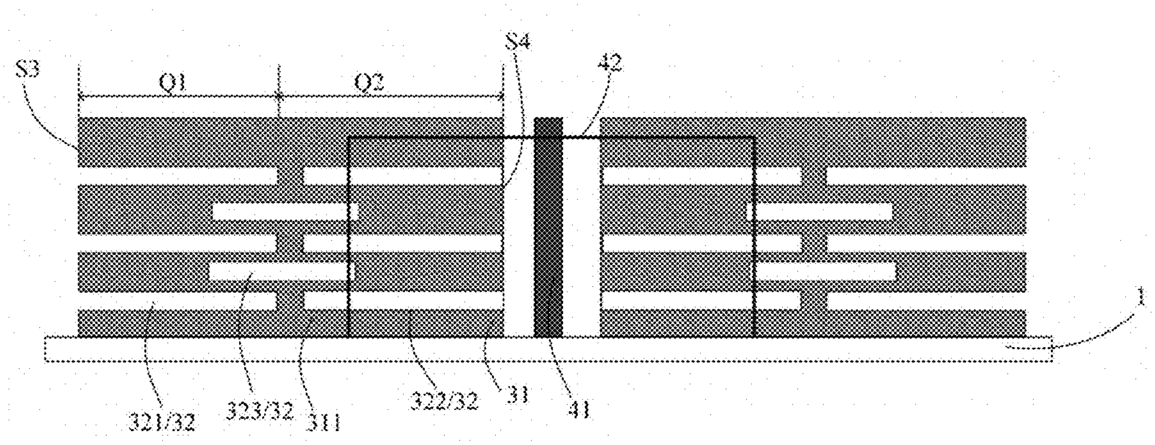
FIG. 25 is a side view of a magnetoelectric dipole antenna in a fifth example of an embodiment of the present disclosure.

A fifth example is as follows. FIG. 25 is a side view of the magnetoelectric dipole antenna in the fifth example of the embodiment of the present disclosure. As shown in FIG. 25, the magnetoelectric dipole antenna in this example is substantially the same in structure as the first example, except that the first slit opening 321 and the second slit opening 322 in each sub-electrode 311 are arranged in one-to-one correspondence, and in this example, third slit openings 323 each extending in the same direction as the extending direction of the first slit opening 321/the second slit opening 322 are further provided in each sub-electrode 311, and two ends of the third slit opening 323 are located in the first region Q1 and the second region Q2, respectively, while the ends of the third slit openings 323 in the first region Q1 are arranged alternately with the first slit openings 321, and the other ends of the third slit openings 323 in the second region Q2 are arranged alternately with the second slit openings 322.

In some examples, the number of third slit openings 323 may or may not be equal to the number of first slit openings 321.

In some examples, the widths and/or the lengths of the respective third slit openings 323 are equal to each other, and it is taken as an example that the third slit opening 323 are equal in both the length and the width in the embodiment of the present disclosure. The rest of the structure is the same as that in the first example, and therefore, the description thereof is not repeated herein.

Figure 26:
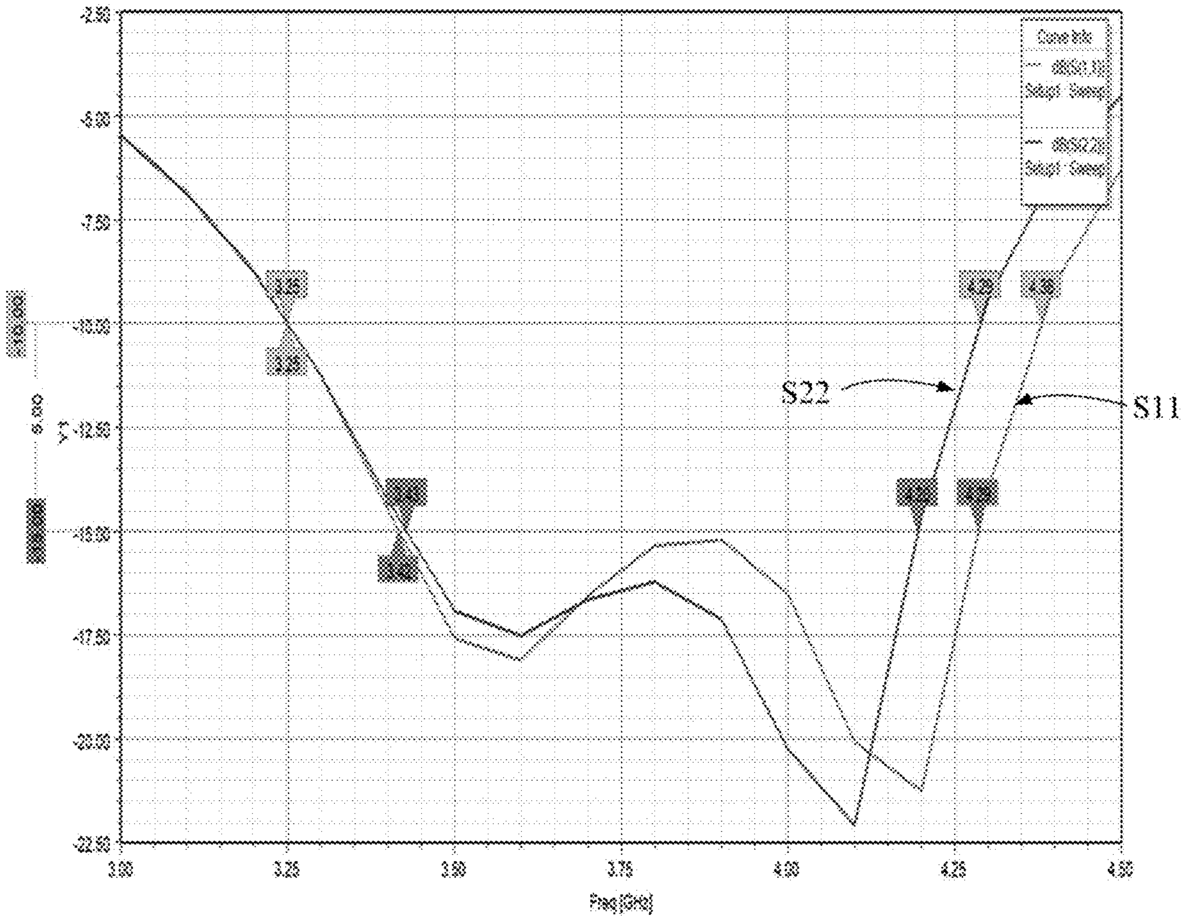
FIG. 26 is a S11 curve of a magnetoelectric dipole antenna in a fifth example.
Figure 27:
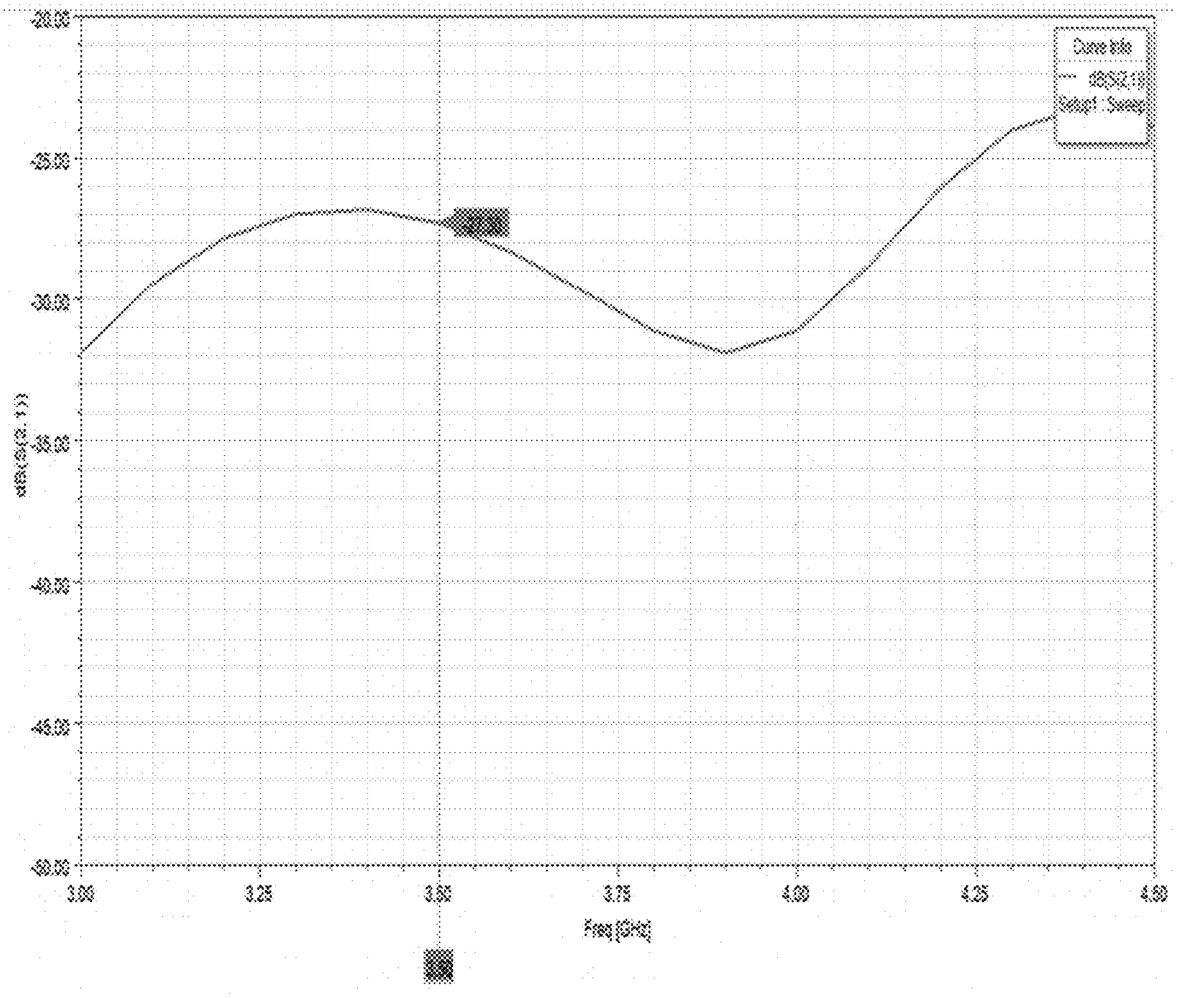
FIG. 27 is a S21 curve of a magnetoelectric dipole antenna in a fifth example.
Figure 28:
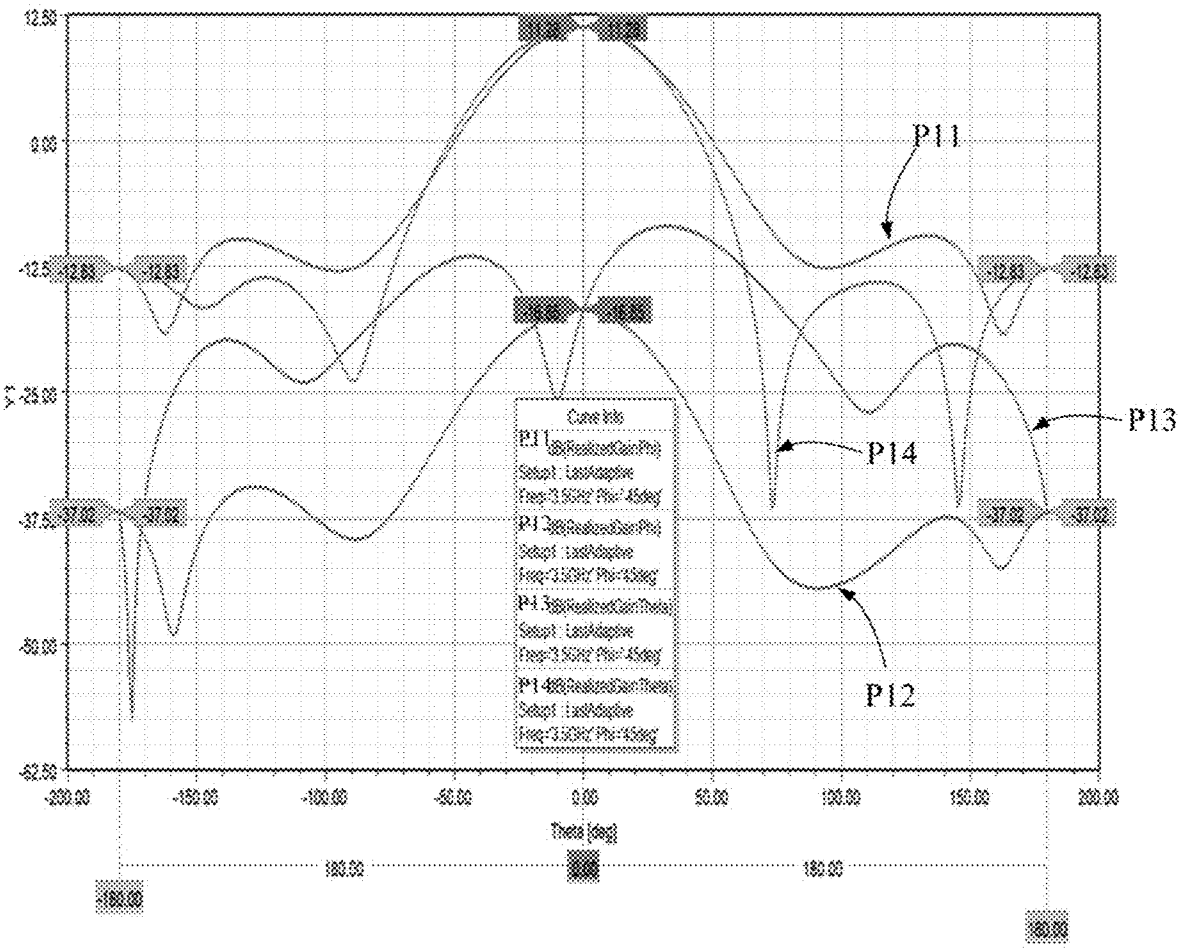
FIG. 28 shows a radiation pattern of a magnetoelectric dipole antenna at Port1 and at a frequency of 3.5 GHz in a fifth example.
Figure 29:
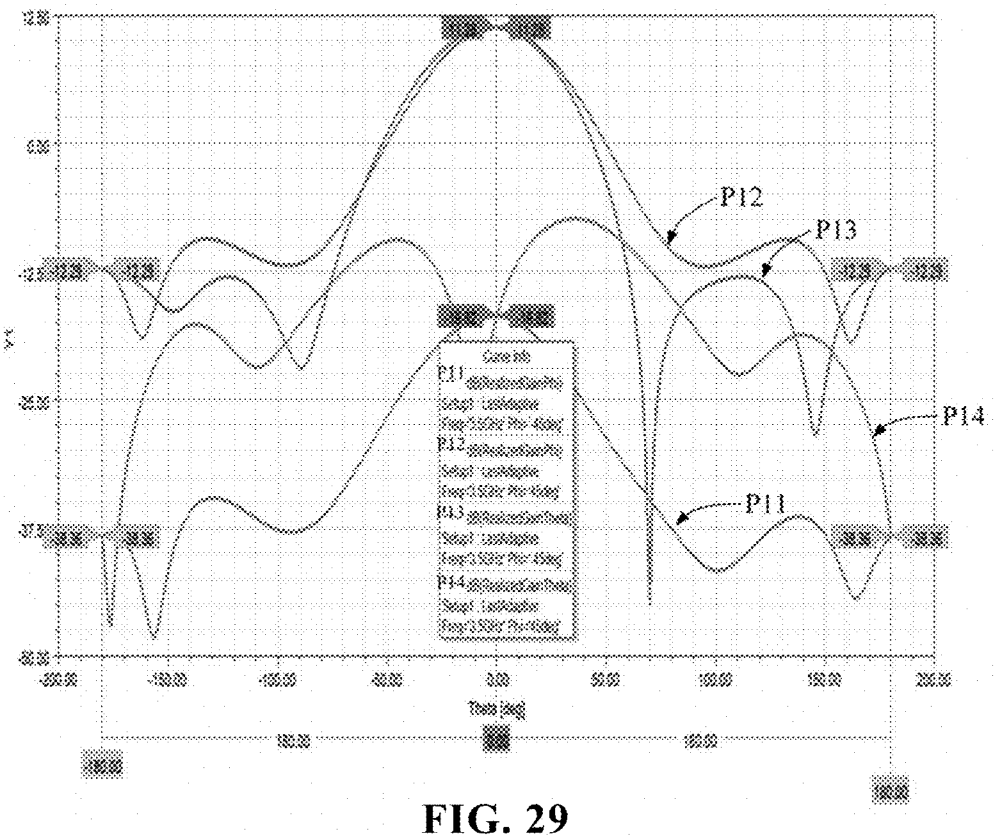
FIG. 29 shows a radiation pattern of a magnetoelectric dipole antenna at Port2 and at a frequency of 3.5 GHz in a fifth example.

In order to make the performance of the magnetoelectric dipole antenna shown in FIG. 25 clearer, the antenna is simulated, and the advantages of the antenna in the embodiment of the present disclosure can be visually seen from the simulation result. FIG. 26 is a S11 curve of the magnetoelectric dipole antenna in the fifth example; FIG. 27 is a S21 curve of the magnetoelectric dipole antenna in the fifth example; FIG. 28 shows a radiation pattern of the magnetoelectric dipole antenna at Port1 and at a frequency of 3.5 GHz in the fifth example; and FIG. 29 shows a radiation pattern of the magnetoelectric dipole antenna at Port2 and at a frequency of 3.5 GHz in the fifth example. As shown in FIGS. 26 to 29, it can be seen that the −15 dB impedance bandwidths of the two ports, i.e. Port1 and Port2, of the antenna are 0.87 GHz (3.42 GHz to 4.29 GHz) and 0.77 GHz (3.43 GHz to 4.20 GHz), respectively; each of the gains of the two ports at the central frequency point (3.5 GHz) is 11.28 dBi; the port isolation is −27.30 dB; the cross polarization ratios are 28.13 dB and 28.10 dB, respectively; and the front-to-back ratios are 24.11 dB and 23.57 dB, respectively. Compared with the first example, the slit openings 32 in the sub-electrode 311 are not alternately arranged. Although the number of slits is greater, the port isolation and cross polarization ratio of the antenna are deteriorated. The impedance bandwidth, the gain, and the front-to-back ratio are not much different from those in the first example, respectively.

Figure 30:
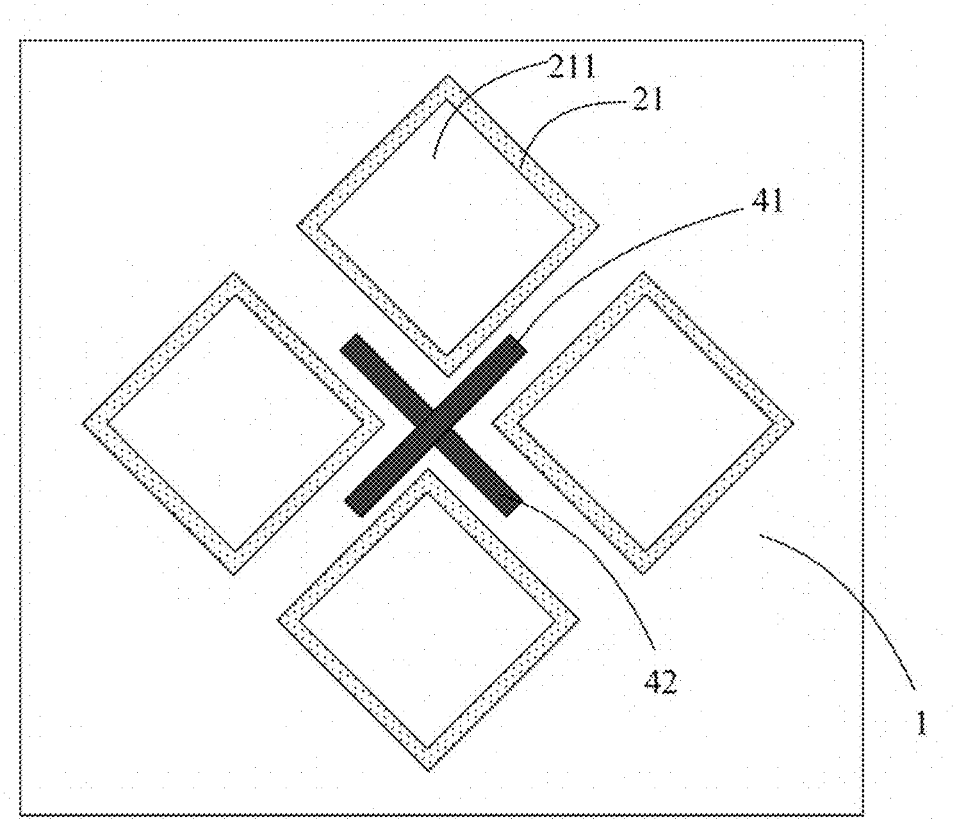
FIG. 30 is a top view of a magnetoelectric dipole antenna in a sixth example of an embodiment of the present disclosure.

A sixth example is as follows. FIG. 30 is a top view of the magnetoelectric dipole antenna in the sixth example of the embodiment of the present disclosure. As shown in FIG. 30, the magnetoelectric dipole antenna in this example is substantially the same in structure as the fifth example, except that the length of the side of each of the four square first electrodes 21 of the magnetoelectric dipole antenna is 18 mm. Compared with the fifth example, the length of the side of the first electrode 21 in this example is reduced, and the center of the patch is hollowed out, that is, a hollowed-out pattern 22 is formed at the center of the first electrode 21, so that the first electrode 21 becomes a hollow square patch. For example, the center of the hollowed-out pattern 22 is the same as the center of an outline of the first electrode 21. The rest of the structure of this antenna is the same as that in the first example, and therefore, the description thereof is not repeated herein.

In this example, through forming a slot (designing the hollowed-out pattern 22) in the electric dipole 2 in the horizontal direction, to bend the current, the lateral size of the antenna is reduced, and a miniaturized high-gain dual-polarized magnetoelectric dipole antenna is obtained.

Figure 31:
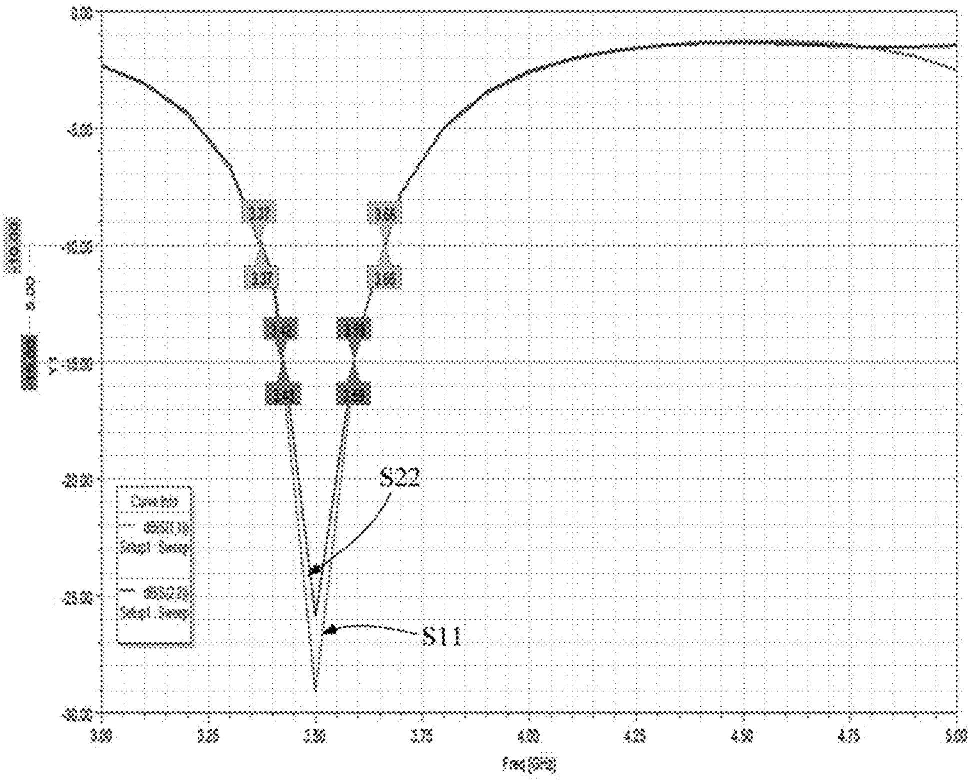
FIG. 31 shows a S11 curve of a magnetoelectric dipole antenna in a sixth example.
Figure 32:
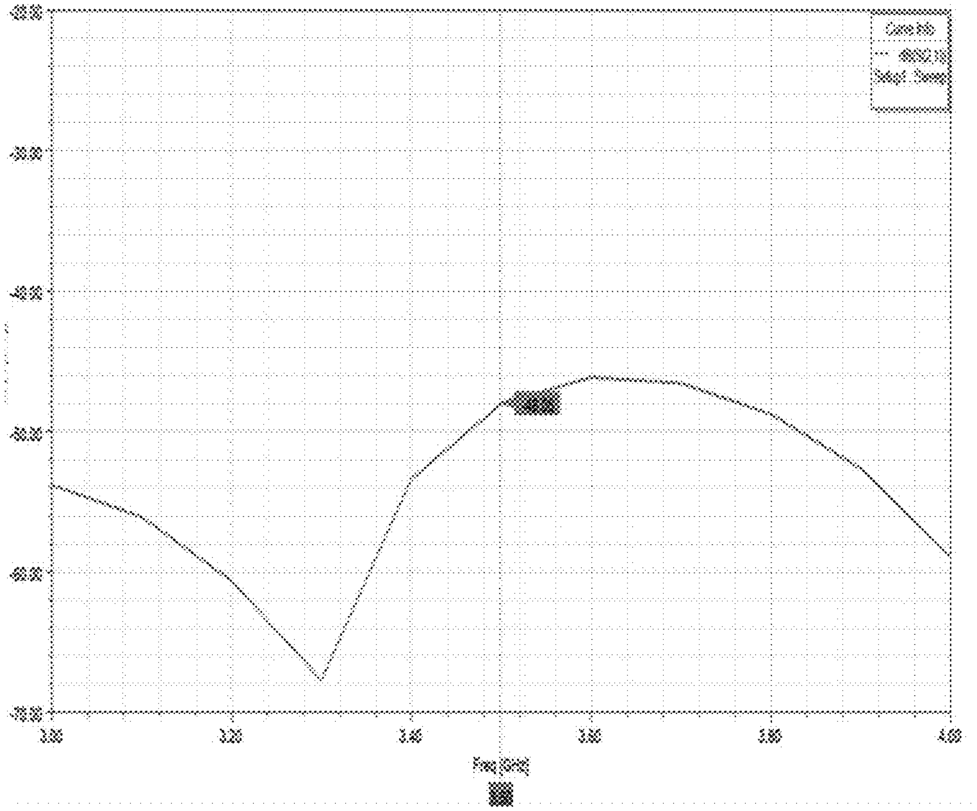
FIG. 32 shows a S21 curve of a magnetoelectric dipole antenna in a sixth example.
Figure 33:
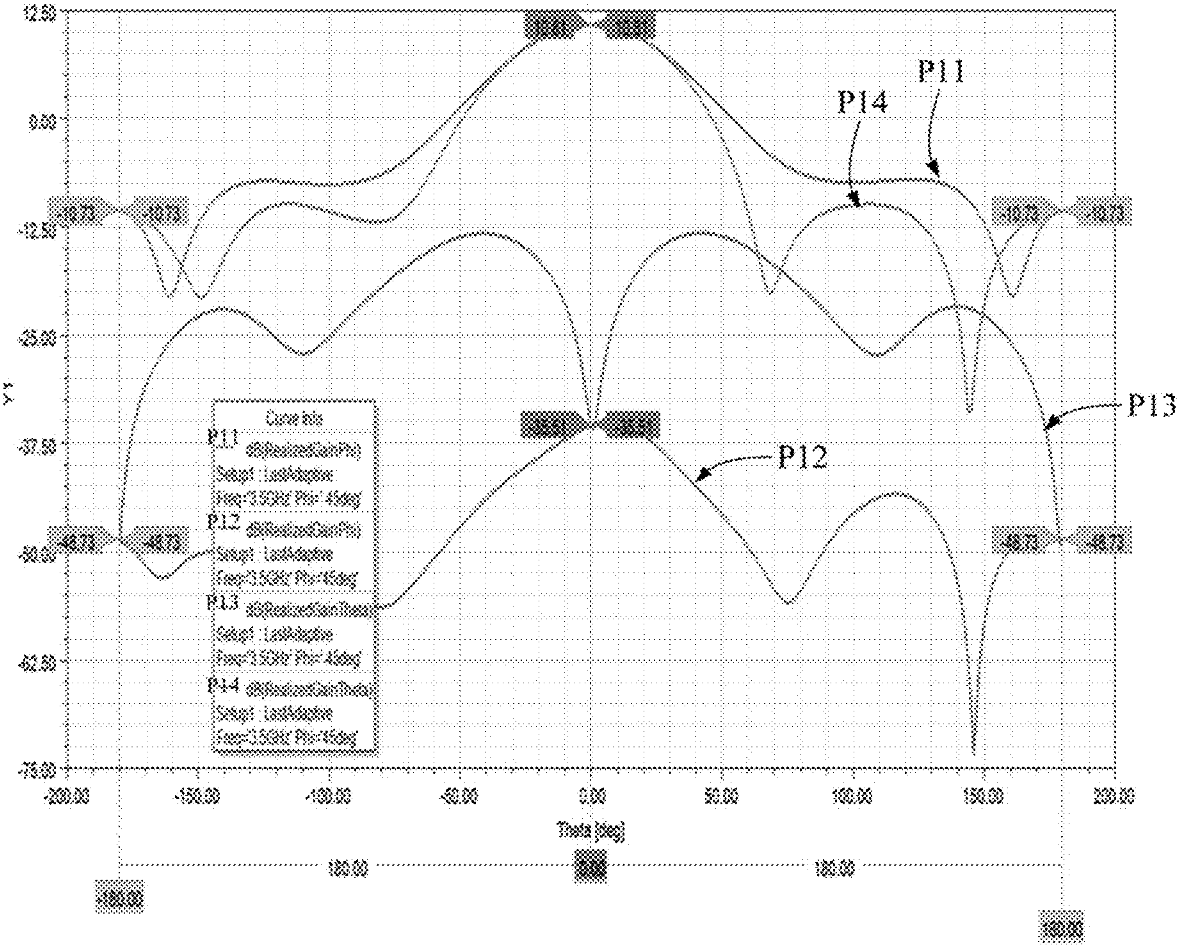
FIG. 33 shows a radiation pattern of a magnetoelectric dipole antenna at Port1 and at a frequency of 3.5 GHz in a sixth example.
Figure 34:
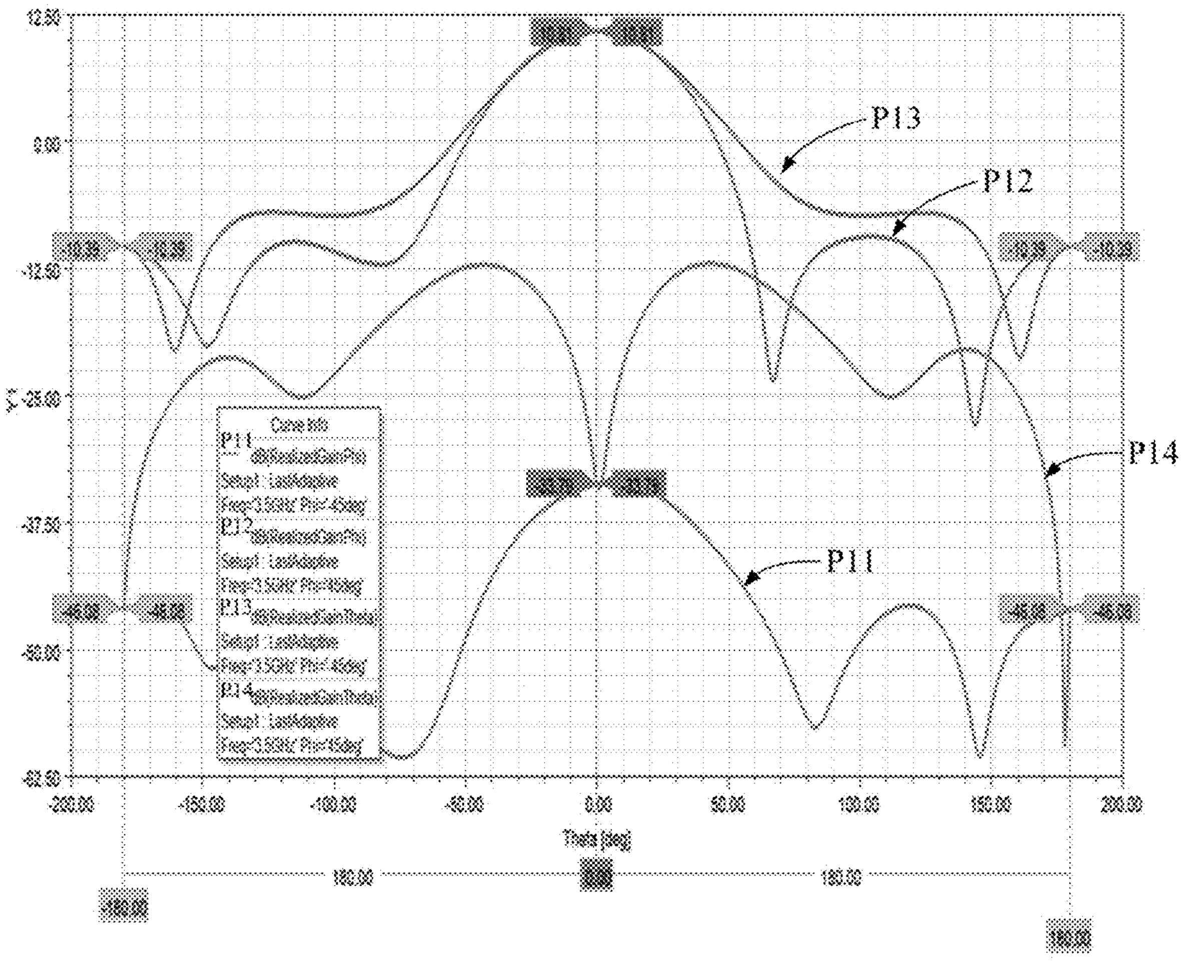
FIG. 34 shows a radiation pattern of a magnetoelectric dipole antenna at Port2 and at a frequency of 3.5 GHz in a sixth example.

In order to make the performance of the magnetoelectric dipole antenna shown in FIG. 30 clearer, the antenna is simulated, and the advantages of the antenna in the embodiment of the present disclosure can be visually seen from the simulation result. FIG. 31 shows a S11 curve of the magnetoelectric dipole antenna in the sixth example; FIG. 32 is a S21 curve of the magnetoelectric dipole antenna in the sixth example; FIG. 33 shows a radiation pattern of the magnetoelectric dipole antenna at Port1 and at a frequency of 3.5 GHz in the sixth example; and FIG. 34 shows a radiation pattern of the magnetoelectric dipole antenna at Port2 and at a frequency of 3.5 GHz in the sixth example. As shown in FIGS. 31 to 34, it can be seen that the −15 dB impedance bandwidths of the two ports, i.e. Port1 and Port2, of the antenna are 0.17 GHz (3.42 GHz to 3.59 GHz) and 0.16 GHz (3.43 GHz to 3.59 GHz), respectively; each of the gains of the two ports at the center frequency point (3.5 GHz) is 10.81 dBi; the port isolation is −48.05 dB; the cross polarization ratios are 46.32 B and 44.60 dB, respectively; and the front-to-back ratios are 21.54 dB and 21.20 dB, respectively. Compared with the fifth example, in this example, the horizontal first electrode 21 is further slotted on the basis of forming the slit openings 32 in the sub-electrode 311. Although the impedance bandwidth of the antenna is significantly deteriorated, and the gain and the front-to-back ratio are also deteriorated, the port isolation and cross polarization ratio are significantly better than those in the fifth example, respectively, and most importantly, the lateral size of the antenna is reduced by 30%, which is beneficial to a layout of a large-scale array antenna.

In a second aspect, an embodiment of the present disclosure provides an electronic device, which may include any one of the dual-polarized magnetoelectric dipole antennas described above.

In some examples, the electronic device provided by an embodiment of the present disclosure further includes a transceiving unit, a radio frequency transceiver, a signal amplifier, a power amplifier, and a filtering unit. The antenna in the communication device may serve as a transmitting antenna or a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the antenna in the communication system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Furthermore, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the antenna system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the electronic device provided by an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A dual-polarized magnetoelectric dipole antenna, comprising a reflection plate, an electric dipole parallel to the reflection plate, and a magnetic dipole perpendicular to and electrically connected to the reflection plate, wherein the electric dipole comprises four first electrodes; the magnetic dipole comprises four second electrodes; the four second electrodes and the four first electrodes are in one-to-one correspondence, and each of the four second electrodes is connected between the first electrode corresponding to the second electrode and the reflection plate;

each of the four first electrodes comprises a first side and a second side connected to each other; for any one of the four first electrodes, the first side of the first electrode is adjacent to the first side of one of the other three first electrodes adjacent to the first electrode, and the second side of the first electrode is adjacent to the second side of other one of the other three first electrodes adjacent to the first electrode; and each of the four second electrodes comprises two sub-electrodes, and the two sub-electrodes are connected to the first side and the second side of the first electrode corresponding to the second electrode, respectively; for any one of the two sub-electrodes, a slit opening is in the sub-electrode, and an extending direction of the slit opening is parallel to a plane where the reflection plate is located, wherein each of the two sub-electrodes comprises a first region and a second region arranged side by side along the extending direction of the slit opening in the sub-electrode, and located on two opposite ends of the sub-electrode in a direction parallel to the reflection plate; the slit opening comprises a first slit opening and a second slit opening; the first slit opening is in the first region, the second slit opening is in the second region, and the first slit opening and the second slit opening are alternately arranged and staggered with each other in a direction perpendicular to the reflection plate.

2. The dual-polarized magnetoelectric dipole antenna according to claim 1, wherein third sides of the two sub-electrodes of each of the four second electrodes are connected to each other, and each of the two sub-electrodes further comprises a fourth side opposite to the third side; and the first slit opening in the sub-electrode penetrates through the fourth side.

3. The dual-polarized magnetoelectric dipole antenna according to claim 1, wherein in each of the two sub-electrodes, numbers of the first slit opening and the second slit opening are equal to each other.

4. The dual-polarized magnetoelectric dipole antenna according to claim 1, wherein in each of the two sub-electrodes, a number of the first slit opening is different by one from a number of second slit opening.

5. The dual-polarized magnetoelectric dipole antenna according to claim 1, wherein in each of the two sub-electrodes, spacings between any two adjacent ones of a plurality of first slit openings are equal to each other, and spacings between any two adjacent ones of a plurality of second slit openings are equal to each other.

6. The dual-polarized magnetoelectric dipole antenna according to claim 1, wherein in each of the two sub-electrodes, widths and/or lengths of respective first slit openings are equal to each other, and widths and/or lengths of respective second slit openings are equal to each other.

7. The dual-polarized magnetoelectric dipole antenna according to claim 1, wherein each of the two sub-electrodes comprises two slit openings, and orthographic projections of the two slit openings on the reflection plate partially overlap each other.

8. The dual-polarized magnetoelectric dipole antenna according to claim 1, wherein each of the two sub-electrodes comprises a first region and a second region arranged side by side along the extending direction of the slit opening in the sub-electrode; the slit openings comprise a first slit opening, a second slit opening, and a third slit opening; the first slit opening is in the first region, the second slit opening is in the second region, and the first slit opening and the second slit opening are arranged in one-to-one correspondence; one end of the third slit opening is in the first region and is arranged alternately with the first slit opening, and the other end of the third slit opening is in the second region and is arranged alternately with the second slit opening.

9. The dual-polarized magnetoelectric dipole antenna according to claim 8, wherein orthographic projections of both ends of the third slit opening on the reflection plate overlap orthographic projections of the first slit opening and the second slit opening on the reflection plate, respectively.

10. The dual-polarized magnetoelectric dipole antenna according to claim 8, wherein in each of the two sub-electrodes, spacings between any two adjacent ones of a plurality of first slit openings are equal to each other, spacings between any two adjacent ones of a plurality of second slit openings are equal to each other, and spacings between any two adjacent ones of a plurality of third slit openings are equal to each other.

11. The dual-polarized magnetoelectric dipole antenna according to claim 8, wherein in each of the two sub-electrodes, widths and/or lengths of respective first slit openings are equal to each other, widths and/or lengths of respective second slit openings are equal to each other, and widths and/or lengths of respective third slit openings are equal to each other.

12. The dual-polarized magnetoelectric dipole antenna according to claim 1, wherein each of the four first electrodes has a hollowed-out pattern therein.

13. The dual-polarized magnetoelectric dipole antenna according to claim 12, wherein a center of the hollowed-out pattern in each of the four first electrodes coincides with a center of an outline of the first electrode.

14. The dual-polarized magnetoelectric dipole antenna according to claim 1, further comprising a first feed line and a second feed line, wherein the four second electrodes of the magnetic dipole define a cross-shaped accommodation region, and the first feed line and the second feed line cross each other in the cross-shaped accommodation region.

15. The dual-polarized magnetoelectric dipole antenna according to claim 14, wherein a spacing between the first feed line and the second feed line is in a range of 0.8 mm to 1.2 mm.

16. The dual-polarized magnetoelectric dipole antenna according to claim 14, wherein the first feed line and the second feed line are both T-shaped feed lines.

17. The dual-polarized magnetoelectric dipole antenna according to claim 14, further comprising a first radio frequency connector connected to the first feed line, and a second radio frequency connector connected to the second feed line.

18. The dual-polarized magnetoelectric dipole antenna according to claim 1, wherein the reflection plate is made of metal.

19. An electronic device, comprising the dual-polarized magnetoelectric dipole antenna according to claim 1.

* * * * *